United States Patent
Imafuku et al.

(10) Patent No.: US 7,342,684 B2
(45) Date of Patent: Mar. 11, 2008

(54) IMAGE PROCESSING METHOD AND APPARATUS

(75) Inventors: Kazuya Imafuku, Kanagawa (JP); Kentaro Yano, Kanagawa (JP); Masao Kato, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 10/664,948

(22) Filed: Sep. 22, 2003

(65) Prior Publication Data
US 2004/0196478 A1    Oct. 7, 2004

(30) Foreign Application Priority Data
Sep. 20, 2002 (JP) ............................. 2002-275829

(51) Int. Cl.
*H04N 1/52* (2006.01)
*H04N 1/58* (2006.01)

(52) U.S. Cl. .................. 358/1.9; 358/534; 358/535; 358/448; 382/252; 382/270

(58) Field of Classification Search ............... 358/1.9, 358/534, 535, 448; 382/252, 270
See application file for complete search history.

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |

(Continued)

FOREIGN PATENT DOCUMENTS

GB    2 352 353    1/2001

(Continued)

OTHER PUBLICATIONS

Robert W. Floyd and Louis Steinberg, "An Adaptive Algorithm for Spatial Greyscale," Proceeding of the SID, vol. 17/2 Second Quarter, 75-77 (1976).

*Primary Examiner*—King Y. Poon
*Assistant Examiner*—Quang N. Vo
(74) *Attorney, Agent, or Firm*—Fitzpatrick, Cella, Harper & Scinto

(57) ABSTRACT

It is an object of this invention to prevent a false edge phenomenon in quantization processing for a multilevel image. In order to achieve this object, according to the invention, (1) a reference threshold (Cthreshold) to be used for error diffusion for a cyan (C) component is obtained on the basis of a density value M of a magenta (M) component. (2) A threshold modulation amount table is referred to by using a combination of a density value C of the C component and the density value M of the M component. (3) A correction threshold modulation amount Cthreshold' is determined by adding the threshold modulation amount obtained in the second step to the reference threshold Cthreshold to be used for error diffusion for the C component. (4) A density Ct after error diffusion for the C component is compared with the correction threshold Cthreshold'. If the density Ct is higher, a quantization value binDataC of the target pixel is set to 255. If the density Ct is lower, the quantization value is set to 0. The same processing as described above is also performed for the cyan component.

26 Claims, 34 Drawing Sheets

U.S. PATENT DOCUMENTS

| | | | |
|---|---|---|---|
| 4,608,577 A | 8/1986 | Hori | 346/140 |
| 4,723,129 A | 2/1988 | Endo et al. | 346/1.1 |
| 4,740,796 A | 4/1988 | Endo et al. | 346/1.1 |
| 5,201,013 A | 4/1993 | Kumagai | 382/50 |
| 5,315,669 A | 5/1994 | Kumagai | 382/50 |
| 5,438,634 A | 8/1995 | Kumagai | 382/169 |
| 5,949,965 A | 9/1999 | Gondek | 395/109 |
| 5,973,803 A | 10/1999 | Cheung et al. | 358/534 |
| 6,169,608 B1 * | 1/2001 | Yoshida | 358/1.9 |
| 6,363,172 B1 | 3/2002 | Cheung et al. | 382/167 |
| 2002/0063898 A1 | 5/2002 | Goto et al. | 358/3.01 |
| 2003/0067617 A1 | 4/2003 | Kato et al. | 358/1.9 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 8-279920 | 10/1996 |
| JP | 8-307669 | 11/1996 |
| JP | 8-307680 | 11/1996 |
| JP | 9-139841 | 5/1997 |
| JP | 2729278 | 12/1997 |
| JP | 11-10918 | 1/1999 |
| JP | 2000-354172 | 12/2000 |
| JP | 2002-171407 | 6/2002 |

* cited by examiner

FIG. 12

| CYAN GRAY LEVEL \ MAGENTA GRAY LEVEL | 0 | 1 | 2 | 3 | 4 | 5 | 6 | 7 | ... | 248 | 249 | 250 | 251 | 252 | 253 | 254 | 255 |
|---|---|---|---|---|---|---|---|---|---|---|---|---|---|---|---|---|---|
| 0 | -10 | -10 | -9 | -9 | -9 | -9 | -9 | -10 | ... | -14 | -15 | -16 | -16 | -17 | -17 | -18 | -20 |
| 1 | -23 | -13 | -12 | -12 | -12 | -12 | -12 | -12 | ... | -12 | -12 | -12 | -12 | -12 | -12 | -21 | -23 |
| 2 | -20 | -13 | -12 | -11 | -11 | -11 | -11 | -10 | ... | -10 | -10 | -10 | -11 | -11 | -12 | -20 | -20 |
| 3 | -19 | -11 | -11 | -11 | -10 | -10 | -9 | -9 | ... | -9 | -9 | -10 | -10 | -18 | -17 | -18 | -19 |
| 4 | -17 | -10 | -10 | -10 | -10 | -9 | -9 | -9 | ... | -9 | -9 | -15 | -16 | -16 | -16 | -17 | -17 |
| 5 | -16 | -9 | -9 | -9 | -9 | -9 | -8 | -8 | ... | -8 | -7 | -14 | -15 | -15 | -15 | -15 | -15 |
| 6 | -15 | -8 | -8 | -9 | -8 | -9 | -8 | -7 | ... | -6 | -14 | -14 | -14 | -14 | -14 | -15 | -14 |
| 7 | -14 | -7 | -8 | -8 |  | -7 | -7 | -7 | ... | -13 | -13 | -13 | -13 | -13 | -14 | -14 | -14 |
| ... | ... | ... | ... | ... | ... | ... | ... | ... | ... | ... | ... | ... | ... | ... | ... | ... | ... |
| 248 | 13 | 21 | 21 | 21 | 22 | 22 | 22 | 15 | ... | 13 | 13 | 13 | 13 | 13 | 13 | 13 | 13 |
| 249 | 14 | 22 | 22 | 22 | 23 | 24 | 16 | 17 | ... | 14 | 14 | 14 | 14 | 14 | 14 | 14 | 14 |
| 250 | 15 | 23 | 24 | 24 | 25 | 17 | 18 | 18 | ... | 15 | 15 | 15 | 15 | 15 | 15 | 15 | 15 |
| 251 | 16 | 25 | 25 | 26 | 18 | 19 | 19 | 19 | ... | 16 | 16 | 16 | 16 | 16 | 16 | 16 | 16 |
| 252 | 17 | 26 | 27 | 19 | 20 | 20 | 20 | 20 | ... | 18 | 17 | 17 | 17 | 17 | 17 | 17 | 17 |
| 253 | 19 | 29 | 21 | 22 | 22 | 21 | 21 | 21 | ... | 19 | 19 | 19 | 19 | 19 | 19 | 19 | 19 |
| 254 | 22 | 24 | 24 | 23 | 23 | 22 | 22 | 23 | ... | 22 | 22 | 22 | 22 | 22 | 22 | 22 | 22 |
| 255 | -1 | -1 | -1 | -1 | -1 | -1 | -1 | -1 | ... | -1 | -1 | -1 | -1 | -1 | -1 | -1 | -1 |

FIG. 14

| MAGENTA GRAY LEVEL \ CYAN GRAY LEVEL | 0 | 1 | 2 | 3 | 4 | 5 | 6 | 7 | ... | 248 | 249 | 250 | 251 | 252 | 253 | 254 | 255 |
|---|---|---|---|---|---|---|---|---|---|---|---|---|---|---|---|---|---|
| 0 | -10 | -10 | -9 | -9 | -9 | -9 | -9 | -10 | ... | -14 | -15 | -16 | -16 | -17 | -17 | -18 | -20 |
| 1 | -23 | -13 | -12 | -12 | -12 | -12 | -12 | -12 | ... | -12 | -12 | -12 | -12 | -12 | -12 | -21 | -23 |
| 2 | -20 | -13 | -12 | -11 | -11 | -11 | -11 | -10 | ... | -10 | -10 | -10 | -11 | -11 | -20 | -20 | -20 |
| 3 | -19 | -11 | -11 | -11 | -10 | -10 | -9 | -9 | ... | -9 | -9 | -10 | -10 | -18 | -17 | -18 | -19 |
| 4 | -17 | -10 | -10 | -10 | -10 | -9 | -9 | -9 | ... | -9 | -9 | -16 | -16 | -16 | -16 | -17 | -17 |
| 5 | -16 | -9 | -9 | -9 | -9 | -9 | -8 | -8 | ... | -8 | -7 | -15 | -15 | -15 | -15 | -15 | -16 |
| 6 | -15 | -8 | -8 | -8 | -8 | -9 | -8 | -7 | ... | -6 | -14 | -14 | -14 | -14 | -14 | -14 | -15 |
| 7 | -14 | -7 | -8 | | | -7 | -7 | -7 | ... | -13 | -13 | -13 | -13 | -13 | -14 | -14 | -14 |
| ... | ... | ... | ... | ... | ... | ... | ... | ... | ... | ... | ... | ... | ... | ... | ... | ... | ... |
| 248 | 13 | 21 | 21 | 21 | 22 | 22 | 22 | 15 | ... | 13 | 13 | 13 | 13 | 13 | 13 | 13 | 13 |
| 249 | 14 | 22 | 22 | 22 | 23 | 24 | 16 | 17 | ... | 14 | 14 | 14 | 14 | 14 | 14 | 14 | 14 |
| 250 | 15 | 23 | 24 | 24 | 25 | 17 | 18 | 18 | ... | 15 | 15 | 15 | 15 | 15 | 15 | 15 | 15 |
| 251 | 16 | 25 | 25 | 26 | 18 | 19 | 19 | 19 | ... | 16 | 16 | 16 | 16 | 16 | 16 | 16 | 16 |
| 252 | 17 | 26 | 27 | 19 | 20 | 20 | 20 | 20 | ... | 18 | 17 | 17 | 17 | 17 | 17 | 17 | 17 |
| 253 | 19 | 29 | 21 | 22 | 22 | 21 | 21 | 21 | ... | 19 | 19 | 19 | 19 | 19 | 19 | 19 | 19 |
| 254 | 22 | 24 | 24 | 23 | 23 | 22 | 22 | 23 | ... | 22 | 22 | 22 | 22 | 22 | 22 | 22 | 22 |
| 255 | -1 | -1 | -1 | -1 | -1 | -1 | -1 | -1 | ... | -1 | -1 | -1 | -1 | -1 | -1 | -1 | -1 |

FIG. 16

| CYAN GRAY LEVEL \ MAGENTA GRAY LEVEL | 0 | 1 | 2 | 3 | 4 | 5 | 6 | 7 | ... | 248 | 249 | 250 | 251 | 252 | 253 | 254 | 255 |
|---|---|---|---|---|---|---|---|---|---|---|---|---|---|---|---|---|---|
| 0 | 10 | 10 | 9 | 9 | 9 | 9 | 9 | 10 | ... | 14 | 15 | 16 | 16 | 17 | 17 | 18 | 20 |
| 1 | 23 | 13 | 12 | 12 | 12 | 12 | 12 | 12 | ... | 12 | 12 | 12 | 12 | 12 | 12 | 21 | 23 |
| 2 | 20 | 13 | 12 | 11 | 11 | 11 | 11 | 10 | ... | 10 | 10 | 10 | 11 | 11 | 12 | 20 | 20 |
| 3 | 19 | 11 | 11 | 11 | 10 | 10 | 9 | 9 | ... | 9 | 10 | 10 | 10 | 18 | 20 | 18 | 19 |
| 4 | 17 | 10 | 10 | 10 | 10 | 9 | 9 | 9 | ... | 9 | 9 | 9 | 16 | 16 | 17 | 17 | 17 |
| 5 | 16 | 9 | 9 | 9 | 9 | 9 | 8 | 8 | ... | 8 | 7 | 15 | 15 | 15 | 16 | 16 | 16 |
| 6 | 15 | 8 | 8 | 8 | 8 | 9 | 8 | 7 | ... | 6 | 14 | 14 | 14 | 14 | 15 | 15 | 15 |
| 7 | 14 | 7 | 8 | ... | 8 | 7 | 7 | 7 | ... | 13 | 13 | 13 | 13 | 13 | 14 | 14 | 14 |
| ... | ... | ... | ... | ... | ... | ... | ... | ... | ... | ... | ... | ... | ... | ... | ... | ... | ... |
| 248 | -13 | -21 | -21 | -21 | -22 | -22 | -22 | -15 | ... | -13 | -13 | -13 | -13 | -13 | -13 | -13 | -13 |
| 249 | -14 | -22 | -21 | -22 | -23 | -24 | -16 | -17 | ... | -14 | -14 | -14 | -14 | -14 | -14 | -14 | -14 |
| 250 | -15 | -23 | -22 | -24 | -25 | -17 | -18 | -18 | ... | -15 | -15 | -15 | -15 | -15 | -15 | -15 | -15 |
| 251 | -16 | -25 | -24 | -26 | -18 | -19 | -19 | -19 | ... | -16 | -16 | -16 | -16 | -16 | -16 | -16 | -16 |
| 252 | -17 | -26 | -25 | -19 | -20 | -20 | -20 | -19 | ... | -18 | -17 | -17 | -17 | -17 | -17 | -17 | -17 |
| 253 | -19 | -29 | -27 | -22 | -22 | -21 | -21 | -20 | ... | -19 | -19 | -19 | -19 | -19 | -19 | -19 | -19 |
| 254 | -22 | -24 | -21 | -23 | -23 | -22 | -22 | -21 | ... | -22 | -22 | -22 | -22 | -22 | -22 | -22 | -22 |
| 255 | 1 | 1 | 1 | 1 | 1 | 1 | 1 | 1 | ... | 1 | 1 | 1 | 1 | 1 | 1 | 1 | 1 |

FIG. 18

| | | CYAN GRAY LEVEL | | | | | | | | | | | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | ... | 248 | 249 | 250 | 251 | 252 | 253 | 254 | 255 |
| MAGENTA GRAY LEVEL | 0 | 10 | 10 | 9 | 9 | 9 | 9 | 9 | 10 | ... | 14 | 15 | 16 | 16 | 17 | 17 | 18 | 20 |
| | 1 | 23 | 13 | 12 | 12 | 12 | 12 | 12 | 12 | ... | 12 | 12 | 12 | 12 | 12 | 12 | 21 | 23 |
| | 2 | 20 | 13 | 12 | 11 | 11 | 11 | 11 | 10 | ... | 10 | 10 | 11 | 11 | 11 | 20 | 20 | 20 |
| | 3 | 19 | 11 | 11 | 10 | 10 | 10 | 9 | 9 | ... | 9 | 9 | 10 | 10 | 18 | 17 | 18 | 19 |
| | 4 | 17 | 10 | 10 | 10 | 10 | 9 | 9 | 9 | ... | 9 | 9 | 9 | 16 | 16 | 16 | 17 | 17 |
| | 5 | 16 | 9 | 9 | 9 | 9 | 9 | 8 | 8 | ... | 8 | 7 | 15 | 15 | 15 | 15 | 16 | 16 |
| | 6 | 15 | 8 | 8 | 8 | 8 | 9 | 8 | 7 | ... | 6 | 14 | 14 | 14 | 14 | 15 | 15 | 15 |
| | 7 | 14 | 7 | 8 | 8 | 8 | 7 | 7 | 7 | ... | 13 | 13 | 13 | 13 | 13 | 14 | 14 | 14 |
| | ... | ... | ... | ... | ... | ... | ... | ... | ... | ... | ... | ... | ... | ... | ... | ... | ... | ... |
| | 248 | -13 | -21 | -21 | -21 | -22 | -22 | -22 | -15 | ... | -13 | -13 | -13 | -13 | -13 | -13 | -13 | -13 |
| | 249 | -14 | -22 | -22 | -22 | -23 | -24 | -16 | -17 | ... | -14 | -14 | -14 | -14 | -14 | -14 | -14 | -14 |
| | 250 | -15 | -23 | -24 | -24 | -25 | -17 | -18 | -18 | ... | -15 | -15 | -15 | -15 | -15 | -15 | -15 | -15 |
| | 251 | -16 | -25 | -25 | -26 | -18 | -19 | -19 | -19 | ... | -16 | -16 | -16 | -16 | -16 | -16 | -16 | -16 |
| | 252 | -17 | -26 | -27 | -19 | -20 | -20 | -20 | -20 | ... | -18 | -17 | -17 | -17 | -17 | -17 | -17 | -17 |
| | 253 | -19 | -29 | -21 | -22 | -22 | -21 | -21 | -21 | ... | -19 | -19 | -19 | -19 | -19 | -19 | -19 | -19 |
| | 254 | -22 | -24 | -24 | -23 | -23 | -22 | -22 | -23 | ... | -22 | -22 | -22 | -22 | -22 | -22 | -22 | -22 |
| | 255 | 1 | 1 | 1 | 1 | 1 | 1 | 1 | 1 | ... | 1 | 1 | 1 | 1 | 1 | 1 | 1 | 1 |

FIG. 20

| CYAN GRAY LEVEL | MAGENTA GRAY LEVEL | | | | | | | |
|---|---|---|---|---|---|---|---|---|
| | 0 | 2 | 4 | 6 | 8 | 10 | 12 | 14 |
| 0 | (9,0,7,0) | (9,0,7,0) | (7,3,3,3) | (8,1,5,2) | (5,1,2,8) | (3,1,2,10) | (4,0,3,9) | (4,1,3,8) |
| 2 | (9,0,7,0) | (9,2,2,3) | (9,2,3,2) | (9,1,4,2) | (9,4,1,2) | (8,0,6,2) | (7,2,3,4) | (7,1,4,4) |
| 4 | (7,3,3,3) | (8,0,2,6) | (8,2,3,3) | (8,3,1,4) | (7,2,1,6) | (7,0,7,2) | (7,1,4,4) | (8,2,3,3) |
| 6 | (8,1,5,2) | (9,0,6,1) | (7,0,5,4) | (8,1,1,6) | (8,2,3,3) | (6,1,3,6) | (7,1,3,5) | (6,1,1,8) |
| 8 | (5,1,2,8) | (8,0,6,2) | (7,0,5,4) | (7,0,6,3) | (7,1,5,3) | (6,2,1,7) | (6,1,3,6) | (6,2,2,6) |
| 10 | (3,1,2,10) | (8,0,6,2) | (7,2,0,7) | (6,1,1,8) | (5,0,2,9) | (7,1,2,6) | (6,0,2,8) | (5,1,2,8) |
| 12 | (4,0,3,9) | (8,2,0,6) | (7,2,0,7) | (6,1,1,8) | (5,1,1,9) | (4,1,2,9) | (3,1,1,11) | (6,1,5,4) |
| 14 | (4,1,3,8) | (9,1,2,4) | (7,2,0,7) | (6,2,0,8) | (5,0,3,8) | (4,1,2,9) | (4,0,3,9) | (3,0,7,6) |

FIG. 33

$$\begin{bmatrix} & & * & C0 \\ C1 & C2 & C3 & X \end{bmatrix}$$

$Cm = Sm/Sum \ (m = 1,...4)$ $Sm = 0, 1, ..., 9$ $Sum = \sum_{m=1}^{4} Sm(\neq 0)$

IMAGE PROCESSING METHOD AND APPARATUS

FIELD OF THE INVENTION

The present invention relates to an image processing method and apparatus and, more particularly, to an image processing method and apparatus which perform pseudo-grayscale processing by performing error diffusion processing for multilevel image density data.

BACKGROUND OF THE INVENTION

Conventionally, as pseudo-grayscale processing for expressing multilevel data in a binary form, an error diffusion method is known (see "An Adaptive Algorithm for Spatial Gray Scale" in Society for Information Display 1975, Symposium Digest of Technical Papers, 1975, p. 36). In this method, letting P be a target pixel, v be the density of the pixel, v0, v1, v2, and v3 be the densities of neighboring pixels P0, P1, P2, and P3 of the pixel P, and T be a threshold for binarization, a binarization error E at the target pixel P is distributed to the neighboring pixels P0, P1, P2, and P3 in accordance with empirically obtained weighting factors W0, W1, W2, and W3 to make the average density macroscopically equal to the density of the original image. In this case, let Do be output binary data, and E be a quantization error.

If $v \geq T$, then Do=1 and $E=v-V\max$

If $v<T$, then Do=0 and $E=v-V\min$  (1)

(where Vmax: maximum density, and Vmin: minimum density)

$v0=v0+E \times W0$  (2)

$v1=v1+E \times W1$  (3)

$v2=v2+E \times W2$  (4)

$v3=v3+E \times W3$  (5)

In this case, for example, weighting factors are set as follows: W0=7/16, W1=1/16, W2=5/16, and W3=3/16.

In performing pseudo-grayscale processing for multiple colors, e.g., four colors, i.e., cyan, magenta, yellow, and black, used in a color ink-jet printer or the like, the above error diffusion method or the like is performed independently for each color. For this reason, although a good visual characteristic is obtained when viewed with respect to a single color component, a good visual characteristic is not always obtained when two or more colors overlap.

In order to solve this problem, pseudo-grayscale processing methods have been disclosed that use the error diffusion method with a combination of two or more colors to obtain a good visual characteristic even where two or more colors overlap (Japanese Patent Laid-Open Nos. 8-279920 and 11-10918). These methods, however, use a fixed binarization threshold for each color, and hence cannot properly cope with a case where different thresholds are set for different colors.

Japanese Patent Laid-Open No. 9-139841 discloses a method of making a similar improvement by independently performing pseudo-grayscale processing for two or more colors and then correcting an output value in accordance with the sum of input values.

The graininess of an intermediate density area of a color image can be effectively reduced by performing image formation so as to prevent dots of cyan components (C) and magenta components (M) from overlapping each other. For this purpose, the following technique is used.

FIG. 6 shows an example of image formation control conforming to a conventional ink-jet scheme.

Assume that image data is expressed by multilevel data with each pixel/each density component (yellow, magenta, cyan, and black: YMCK) consisting of eight bits (gray levels "0" to "255").

Letting C and M be the density values of the C and M components of an original image, densities Ct and Mt of the C and M components of a target pixel of a multilevel color image to be printed are expressed by $Ct=C+Cerr$ $Mt=M+Merr$ where Cerr and Merr are the values error-diffused to the C and M components of the target pixel.

As shown in FIG. 6, in image formation for C and M, image formation control is performed in the following four ways for the obtained values of C and M in accordance with the densities of the C and M components of the target pixel.

1. If the sum of (Ct+Mt) is equal to or less than a threshold (Threshold 1), i.e., the sum belongs to an area 611 in FIG. 6, no dot print operation using C and M inks is performed.

2. If the sum of (Ct+Mt) exceeds the threshold (Threshold 1) and is less than the other threshold (threshold 2), and Ct>Mt, i.e., the sum belongs to an area 612 in FIG. 6, dot print operation is performed by using only C ink.

3. If the sum of (Ct+Mt) exceeds the threshold (Threshold 1) and is less than the other threshold (Threshold 2), and Ct≦Mt, i.e., the sum belongs to an area 613 in FIG. 6, dot print operation is performed by using only M ink.

4. If the sum of (Ct+Mt) is equal to or more than the other threshold (Threshold 2), i.e., the sum belongs to an area 614 in FIG. 6, dot print operation is performed by using both C and M inks.

In this case, Threshold 1<Threshold 2.

Japanese Patent Laid-Open No. 2000-354172 also discloses other error diffusion halftone methods. In one method, in order to make it more difficult for cyan and magenta dots to overlap each other than in the above error diffusion halftone method, where one dot is to be printed, a threshold is modulated on the basis of the sum of cyan and magenta density values so as to make it unlikely for a dot of the other of those two colors to be printed at the same location. In the other error diffusion halftone method, in order to suppress the texture unique to a highlight portion of an image, an error diffusion coefficient that influences dot dispersion properties is changed on the basis of the sum of cyan and magenta density values.

In the above method of individually performing error diffusion for each color, improvements in the avoidance of false edges and in dot dispersion properties have been made. "False edge" is a phenomenon in which dot formation is delayed relative to where it should occur by the accumulation of quantization errors. In the error diffusion halftone method, for example, even on a surface with uniform density, a pixel value may vary across a quantization threshold due to the accumulation of quantization errors. If positive errors are accumulated, a dot is formed. In contrast, if negative errors are accumulated, no dot is formed, resulting in dot omission. In this case, dot formation or omission is delayed until accumulated errors exceed a threshold. This is the so-called false edge phenomenon or discharge phenomenon. Dot dispersion properties literally indicate how dots are dispersed on a printing surface. When dots are unevenly distributed and chained to each other on a highlight portion and a shadow portion, in particular, a texture different from that of the original image may be produced.

Japanese Patent Laid-Open Nos. 8-307669 and 8-307680 disclose error diffusion halftone methods that use a threshold modulation amount set on the basis of the density value of a target color of a target pixel in order to make an improvement in false edge.

Japanese Patent No. 2729278 discloses an error diffusion halftone method that uses an error diffusion coefficient set on the basis of the density value of a target color of a target pixel in order to improve dot dispersion properties.

When, however, a threshold modulation amount set on the basis of the density value of a quantization target color as disclosed in Japanese Patent Laid-Open No. 8-307669 and Japanese Patent Laid-Open No. 8-307680 is applied to the error diffusion method of obtaining a good visual characteristic with respect an overlap of two or more colors as disclosed in Japanese Patent Laid-Open No. 9-139841, an adverse effect such as chaining of dots as shown in FIG. 8 is produced. This is because, in the error diffusion method for an overlap of two or more colors, a threshold for determining on/off control of dots with respect to a quantization target color is not constant and dynamically varies depending on the density values of the other colors unlike the error diffusion method for a single color. That is, for the error diffusion method to be used among a plurality of colors, a threshold modulation amount must be set in consideration of not only the density value of a quantization target color but also the density values of other colors that influence the threshold for the target color.

Consider also dot dispersion properties. When an error diffusion coefficient set on the basis of the density value of a quantization target color is used as disclosed in Japanese Patent No. 2729278, only a faulty dot arrangement like the one shown in FIG. 10 may be obtained. This is also because, in the error diffusion method for overlaps of two or more colors, a threshold for determining on/off control of dots for a target color is not always constant, but dynamically varies depending on the density values of other colors, unlike in the error diffusion method for a single color.

That is, in the error diffusion method to be used among a plurality of colors, in which quantization is performed by comparing the sum of a plurality of color component values with a threshold, in order to realize false edge improvement and dot dispersion property improvement, error diffusion coefficients must be set in consideration of not only the density of a quantization target color but also the density values of other colors which influence a threshold for the color.

SUMMARY OF THE INVENTION

The present invention has been made in consideration of the prior art, and has as its object to provide an image processing method and apparatus which realize false edge improvement and dot dispersion property improvement for an error diffusion method to be used among a plurality of colors regardless of the manner of setting thresholds.

It is another object of the present invention to provide a high-speed image processing method and apparatus which can obtain various modulation amounts by making references.

It is still another object of the present invention to provide an image processing method and apparatus which can reduce the data amount of parameters by using, for an error diffusion method for a single color, some of parameters such as threshold modulation amounts, density value modulation amounts, and error diffusion coefficients prepared for an error diffusion method to be used among a plurality of colors when the error diffusion method to be used among a plurality of colors and the error diffusion method for a signal color are switched for each plane.

In order to achieve the above objects, an image processing apparatus according to the present invention has the following arrangement.

An image processing apparatus for quantizing multilevel color image data containing at least two kinds of color components, comprises error addition means for adding a quantization error value distributed from a neighboring pixel for each color component to each of a plurality of color components contained in a target pixel;

a threshold table which stores a quantization threshold for each of the color components in accordance with a combination of color component values of pixels;

modulation amount determination means for determining a threshold modulation amount of each color in accordance with a combination of color component values of pixels including the target pixel; and quantization means for acquiring a threshold for each color component from the threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added by the error addition means.

The modulation amount determination means preferably determines a threshold modulation amount for each color in accordance with a combination of color component values of the target pixel.

The modulation amount determination means preferably determines a threshold modulation amount for each color in accordance with a combination of average values, maximum values, or minimum values of color components of the target pixel and a neighboring pixel thereof.

Alternatively, according to the present invention, an image processing apparatus for quantizing multilevel color image data containing at least two kinds of color components, comprises error addition means for adding a quantization error value distributed from a neighboring pixel for each color component to each of a plurality of color components contained in a target pixel;

quantization means for quantizing each color component of the target pixel; and a diffusion coefficient table which stores a diffusion coefficient for diffusing a quantization error produced by the quantization means, in accordance with a combination of color component values of a pixel, wherein the error addition means adds an error value to the target pixel in accordance with a combination of color components of the target pixel and a diffusion coefficient selected from the diffusion coefficient table.

The error addition means preferably selects a diffusion coefficient from the diffusion coefficient table in accordance with a combination of color component values of the target pixel.

The error addition means preferably selects a diffusion coefficient from the diffusion coefficient table in accordance with a combination of average values, maximum values, or minimum values of color components of the target pixel and a neighboring pixel thereof.

The error addition means preferably selects a diffusion coefficient from the diffusion coefficient table in accordance with a product of color component values of the target pixel and a neighboring pixel thereof.

Alternatively, an image processing apparatus for quantizing multilevel color image data containing at least two kinds of color components, comprises:

error addition means for adding a quantization error value distributed from a neighboring pixel for each color component to each of a plurality of color components contained in a target pixel;

a threshold table which stores a quantization threshold for each of the color components in accordance with a combination of color component values of pixels;

modulation amount determination means for determining a threshold modulation amount of each color in accordance with a combination of color component values of pixels including the target pixel;

quantization means for acquiring a threshold for each color component from the threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added by the error addition means; and a diffusion coefficient table which stores a diffusion coefficient for diffusing a quantization error produced by the quantization means, in accordance with a combination of color component values of a pixel, wherein the error addition means adds an error value to the target pixel in accordance with a combination of color components of the target pixel and a diffusion coefficient selected from the diffusion coefficient table.

Alternatively, provided is an image processing apparatus for quantizing multilevel color image data containing at least three kinds of color components, wherein a combination of two kinds of color components is quantized by an image processing apparatus defined above, and a remaining color component is quantized by the image processing apparatus defined above with a value of a color component other than a target color component being regarded as 0.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing an example of a threshold modulation amount table set for cyan in correspondence with combinations of two color component values, i.e., C and M component values;

FIG. 14 is a view showing an example of a threshold modulation amount table set for magenta in correspondence with combinations of two color component values, i.e., C and M component values;

FIG. 16 is a view showing an example of a density value modulation amount table set for cyan in correspondence with combinations of two color component values, i.e., C and M component values;

FIG. 18 is a view showing an example of a density value modulation amount table set for magenta in correspondence with combinations of two color component values, i.e., C and M component values;

FIG. 20 is a view showing an example of error diffusion coefficients set in correspondence with combinations of two color component values, i.e., C and M component values, in which the respective numbers in each field represent (g0, g1, g2, g3), and (g0, g1, g2, g3) represent error diffusion coefficients in the respective directions in FIG. 21;

FIG. 33 is a view showing an example of a combination of diffusion coefficients.

DETAILED DESCRIPTION OF THE PREFERRED EMBODIMENTS

Preferred embodiments of the present invention will be described in detail below with reference to the accompanying drawings.

An outline of an overall information processing system, an outline of a hardware arrangement, an outline of a software arrangement, and an outline of image processing, which are commonly used in the first to fourth embodiments, will be described first.

Arrangement Common to Embodiments

Figure 1:
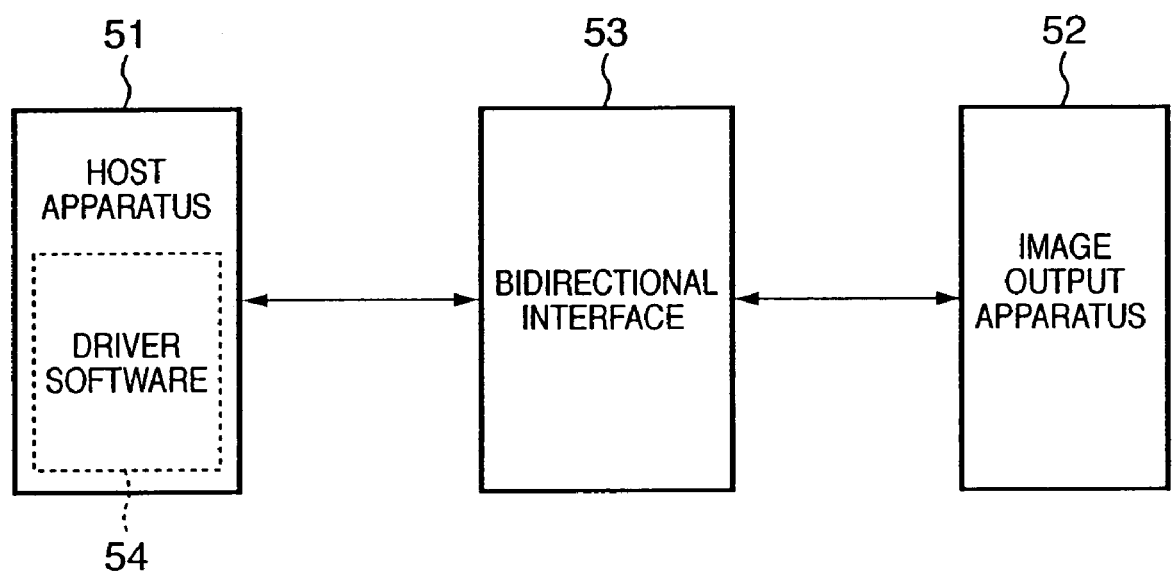
FIG. 1 is a block diagram showing the schematic arrangement of an information processing system according to a common embodiment of the present invention.

FIG. 1 is a block diagram showing the schematic arrangement of an information processing system according to a common embodiment of the present invention. As shown in FIG. 1, this information processing system includes a host apparatus 51 constituted by a personal computer and the like and an image output apparatus 52 constituted by a printer and the like. These apparatuses are connected to each other through a bidirectional interface 53. Driver software 54 to which the present invention is applied is loaded in a memory in the host apparatus 51.

<1. Hardware Arrangements of Host Apparatus 51 and Image Output Apparatus 52>

Figure 2:
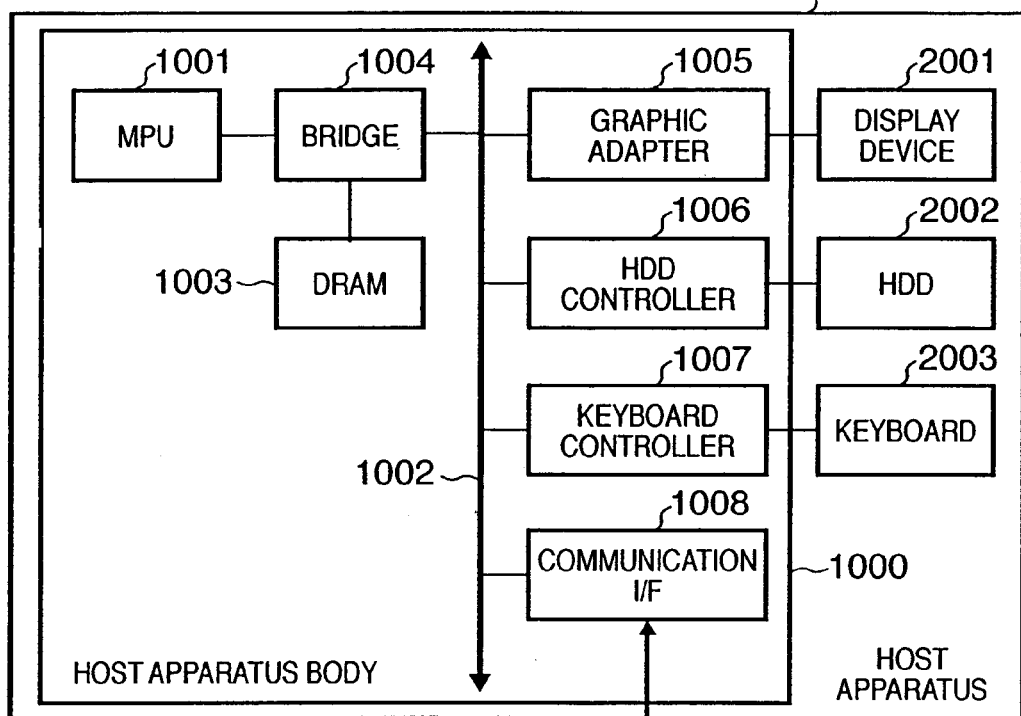
FIG. 2 is a block diagram showing an outline of the hardware arrangement of a host apparatus 51 and image output apparatus 52 which constitute the information processing system.
Figure 2:
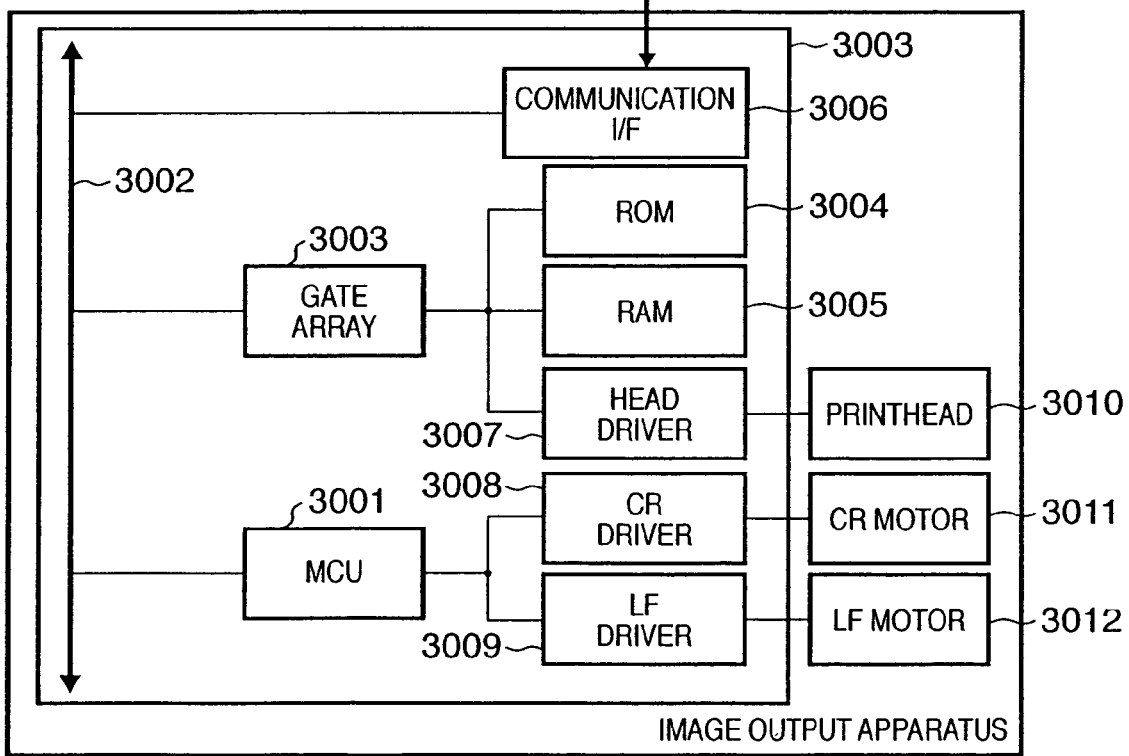

The hardware arrangements of the host apparatus 51 and image output apparatus 52 will be described next. FIG. 2 is a block diagram showing outlines of the hardware arrangements of the host apparatus 51 and image output apparatus 52 constituting the information processing system.

As shown in FIG. 2, the overall host apparatus 51 includes a processing unit 1000 and its peripheral units. The image output apparatus 52 includes a printhead 3010, a carrier (CR) motor 3011 which drives a carrier for transferring the printhead 3010, a driving unit such as a convey motor 3012 for conveying paper sheets, and a control circuit unit 3003.

The processing unit 1000 of the host apparatus 51 includes an MPU 1001 for controlling the overall host apparatus in accordance with a control program, a bus 1002 for connecting system constituent elements to each other, a DRAM 1003 for temporarily storing a program executed by the MPU 1001, data, and the like, system and memory buses, a bridge 1004 for connecting the MPU 1001, and a graphic adapter 1005 which has a control function of displaying graphic information on a display device 2001 such as a CRT.

The processing unit 1000 further includes an HDD controller 1006 for interfacing with an HDD unit 2002, a keyboard controller 1007 for interfacing with a keyboard 2003, and a communication I/F 1008 serving as a parallel interface which controls communication with the image output apparatus 52 in accordance with the IEEE1284 specifications.

The display device 2001 (CRT in this case) for displaying graphic information and the like to an operator is connected to the processing unit 1000 through the graphic adapter 1005. In addition, the hard disk drive (HDD) unit 2002 serving as a large-capacity storage unit in which programs and data are stored and keyboard 2003 are connected to the processing unit 1000 through a controller.

The control circuit unit 3003 of the image output apparatus 52 includes a MCU 3001 which has both a control program execution function and a peripheral unit control function and controls the overall image output apparatus 52, a system bus 3002 which connects the respective components in the control circuit unit, and a gate array (G. A.) incorporating mechanisms for, for example, supplying print data to the printhead 3010, performing memory address decoding, and generating control pulses to the carrier motor, as control circuits.

The control circuit unit 3003 includes a ROM 3004 which stores control programs executed by the MCU 3001, host print information, and the like, a DRAM 3005 which stores various kinds of data (image print information, print data to be supplied to the head, and the like), a communication I/F 3006 serving as a parallel interface for controlling communication with the host apparatus 51 in accordance with the IEEE1284 specifications, a head driver 3007 which performs conversion to an electrical signal for driving the printhead 3010 on the basis of a head print signal output from the control circuit unit 3003.

The control circuit unit 3003 also includes a CR motor driver 3008 for converting a carrier motor control pulse output from the control circuit unit 3003 into an electrical signal for actually driving the carrier (CR) motor 3011, and an LF motor driver 3009 for converting a convey motor control pulse output from the MCU 3001 into a electrical signal for actually driving the convey motor.

A specific arrangement of the image output apparatus 52 will be described next.

Figure 3:
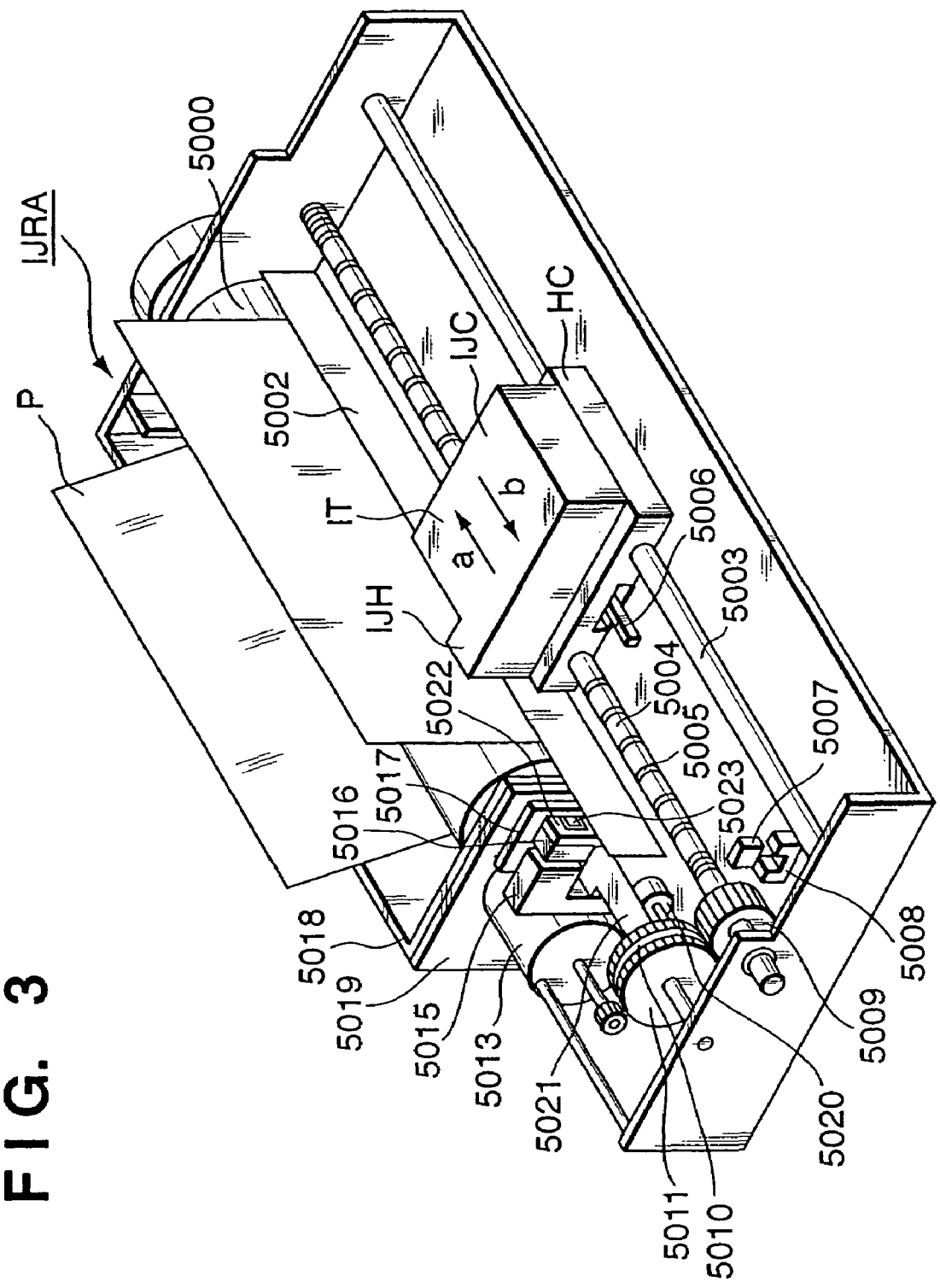
FIG. 3 is a perspective view showing an outline of the arrangement of an ink-jet printer IJRA which is a representative embodiment of the image output apparatus 52.

FIG. 3 is an outer perspective view showing an outline of the arrangement of the ink cartridge IJRA which is a representative embodiment of the image output apparatus 52.

Referring to FIG. 3, a carriage HC which engages with a helical groove 5004 of a lead screw 5005 which rotates through driving force transmission gears 5009 to 5011 upon forward/reverse rotation of a driving motor 5013 has pins (not shown) and is supported by a guide rail 5003 to reciprocally move in the directions indicated by arrows a and b. The carriage HC incorporates an integral ink-jet cartridge IJC incorporating the printhead IJH and ink tank IT. Reference numeral 5002 denotes a paper press plate which presses a print sheet P against a platen 5000 along the moving direction of the carriage HC. Photocouplers 5007 and 5008 constitute a home position detector for checking the presence of a lever 5006 of the carriage in this area to change the rotating direction of the driving motor 5013 and the like. A member 5016 is a member for supporting a cap member 5022 which caps the front surface of the printhead IJH. A suction device 5015 is an aspirator which evacuates the cap and restores the printhead by suction through an intra-cap opening 5023. A member 5019 is a member which allows a cleaning blade 5017 to move back and forth. These members are supported by a main body support plate 5018. Obviously, the blade is not limited to this form, and a known cleaning blade can be applied to this arrangement. A lever 5021 is a lever for starting suction for suction restoration. This lever moves upon movement of a cam 5020 which engages with the carriage, and driving force from the driving motor is controlled for movement by a known transmission mechanism such as a clutch switching mechanism.

With regard to the capping, cleaning, and suction restoration, when the carriage moves to an area on the home position side, desired processes can be performed at corresponding positions by the effect of the lead screw 5005. However, any mechanisms can be applied to this arrangement as long as desired operations can be done at known timings.

As described above, an ink tank IT and printhead IJH may be integrated into a replaceable ink cartridge IJC. Alternatively, the ink tank IT and printhead IJH may be designed to be detachable to allow only the ink tank IT to be replaced with a new one when ink runs out.

An ink-jet printer IJRA incorporates the control circuit unit described in FIG. 2.

The printhead IJH can print a color image by using at least four kinds of inks, i.e., yellow (Y), magenta (M), cyan (C), and black (K) inks, on the basis of the multilevel density data of Y, M, C, and K components.

2. Outline of Software Arrangement and Outline of Image Processing

Figure 4:
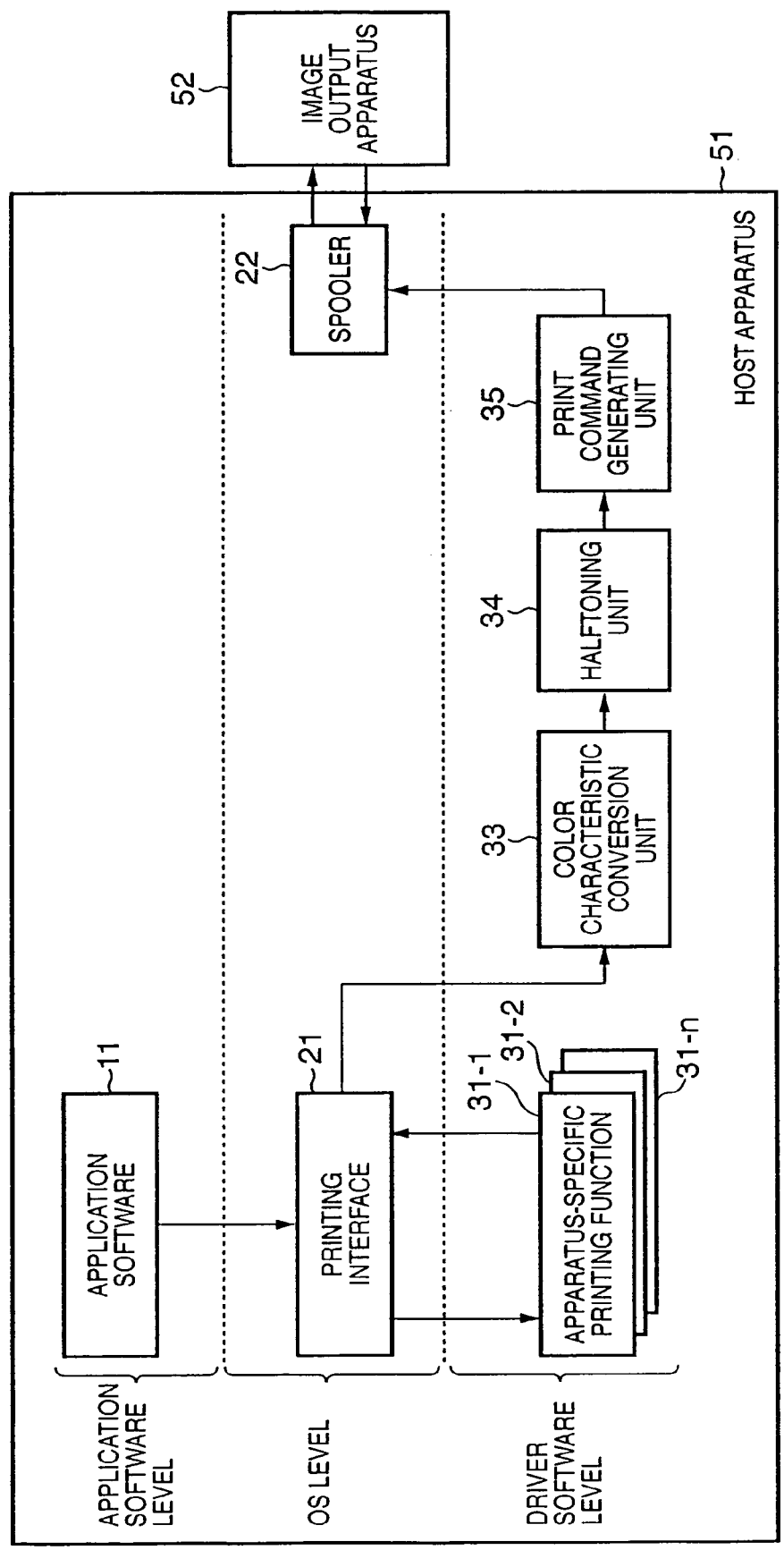
FIG. 4 is a block diagram showing the structure of software used in the information processing system.

FIG. 4 is a block diagram showing the structure of software used in the above information processing system.

As is obvious from FIG. 4, in order to output print data to the image output apparatus 52, three pieces of software, i.e., application software, an operating system, and driver software, which have a hierarchical structure in the host apparatus 51, perform image processing in cooperation with each other.

In this embodiment, portions individually dependent on image output apparatuses are handled by apparatus-specific printing functions 31-1, 31-2, . . . , 31-n and are separated from programs that can commonly process program components dependent on individual implementation of the image output apparatuses. In addition, the basic processing portion of the driver software is independent of each image output apparatus.

A line-segmented image converted into a quantization amount is subjected to image processing such as color characteristic conversion 33 and gray scale processing (halftoning) 34. In addition, in print command generation 35, the data created upon data compression/command addition is transferred to the image output apparatus 52 through a spooler 22 prepared for an OS (Operating System).

As shown in FIG. 4, application software 11 is provided at the application software level, and a printing interface 21 and the spooler 22 are provided at the OS (Operating System) level. The printing interface 21 receives a print instruction from the application software 11. The spooler 22 transfers generated image data to the image output apparatus 52 such as an ink-jet printer.

The apparatus-specific printing functions 31-1, 31-2, . . . , 31-n, the color characteristic conversion unit 33, the halftoning unit 34, and the print command generating unit 35 are provided at the driver software level. The apparatus-specific printing functions 31-1, 31-2, . . . , 31-n respectively store expression forms unique to the image output apparatuses. The color characteristic conversion unit 33 receives line-segmented image information from the OS and converts the colorimetric system inside the driver to the colorimetric system unique to the device. The halftoning unit 34 performs conversion to a quantization amount representing the state of each pixel in the device. The print command generating unit 35 outputs the halftoned image data to the image output apparatus 52 upon adding a command to the data.

A specific case wherein application software outputs an image to the image output apparatus 52 will be described next with reference to the flow chart of FIG. 5 which shows an outline of image processing, together with FIG. 4.

When the application software 11 is to output an image to the image output apparatus 52, the application software 11 issues first a print instruction, e.g., a character, line segment, graphic pattern, or bit map print instruction through the printing interface 21 (step S1).

When print instructions for forming a frame/sheet surface are completed (step S2), the OS converts each print instruction from the internal form of the OS into an expression form unique to the apparatus (line segmentation of each print unit) while invoking the apparatus-specific printing functions 31-1, 31-2, . . . , 31-n inside the driver software (step S3), and transfers the resultant information as image information obtained by line segmentation of the frame/sheet surface to the driver software (step S4).

In the driver software, the color characteristic conversion unit 33 corrects the color characteristics of the device, and converts the colorimetric system in the driver software into the colorimetric system unique to the device (step S5). The halftoning unit 34 further performs conversion to a quantization amount representing the state of each pixel in the device (halftoning) (step S6). Note that conversion to a quantization amount corresponds to the form of data to be processed by the image output apparatus 52. If, for example, the image output apparatus is to perform printing based on binary data, binarization is performed. If the image output apparatus is to perform printing based on multilevel data (for printing operation using dark and light ink dots and printing operation using large and small ink dots), conversion to multilevel data is performed.

This halftoning will be described in detail later in each embodiment to be described later.

The print command generating unit 35 receives image data, each of which is quantized (binarized or converted into multilevel data) (step S7). The print command generating unit 35 processes the quantized image information in accordance with the characteristics of the image output apparatus by different methods. In addition, this module performs data compression and addition of a command header (step S8).

Subsequently, the print command generating unit 35 transfers the generated data to the spooler 22 provided inside the OS (step S9), and outputs the data to the image output apparatus 52 (step S10).

Figure 5:
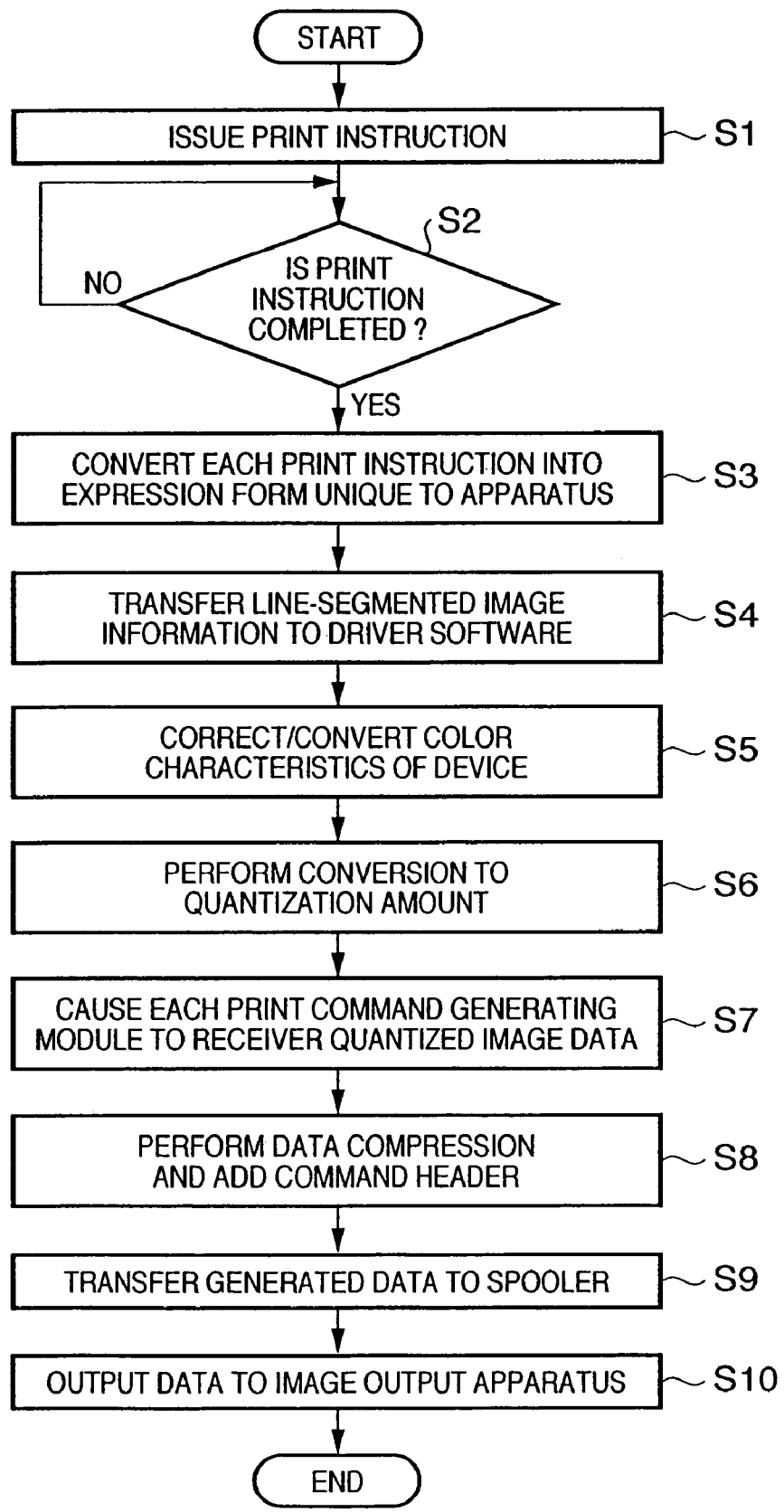
FIG. 5 is a flow chart showing an outline of image processing.

In this embodiment, the above control method can be implemented by storing a program corresponding to the flow chart of FIG. 5 in a storage unit in the host apparatus 51 and executing it.

As described above, since the basic processing portion of the driver software is independent of each image output apparatus, allocation of data processing between the driver software and the image output apparatus can be flexibly changed without impairing the arrangement of the driver software. This leads to advantageous effects in terms of software maintenance and management.

Several embodiments using systems conforming to the common embodiment described above will be described next. In each of the following embodiments, error diffusion processing executed by the halftoning unit 34 will be described in detail.

Assume that in error diffusion processing to be described below, each pixel is density data constituted by a yellow (Y) component, magenta (M) component, cyan (C) component, and black (K) component, and multilevel image data formed from 8 bits (256 gray levels) is used as each component.

First Embodiment

In this embodiment, an error diffusion scheme of performing control more easily to prevent inks of two or more colors from overlapping each other will be described. Assume that each pixel/each density component (YMCK) of image data is expressed by multilevel data constituted by 8 bits (the gray levels "0" to "255"), and output data is binary data. In this embodiment, attention will be given to cyan and magenta, in particular. Yellow and black components may be quantized for the respective colors as in the prior art. Alternatively, all Y, M, C, and K components may be quantized in combination in a manner to be described later.

<Arrangement of Halftoning Unit>

Figure 22:
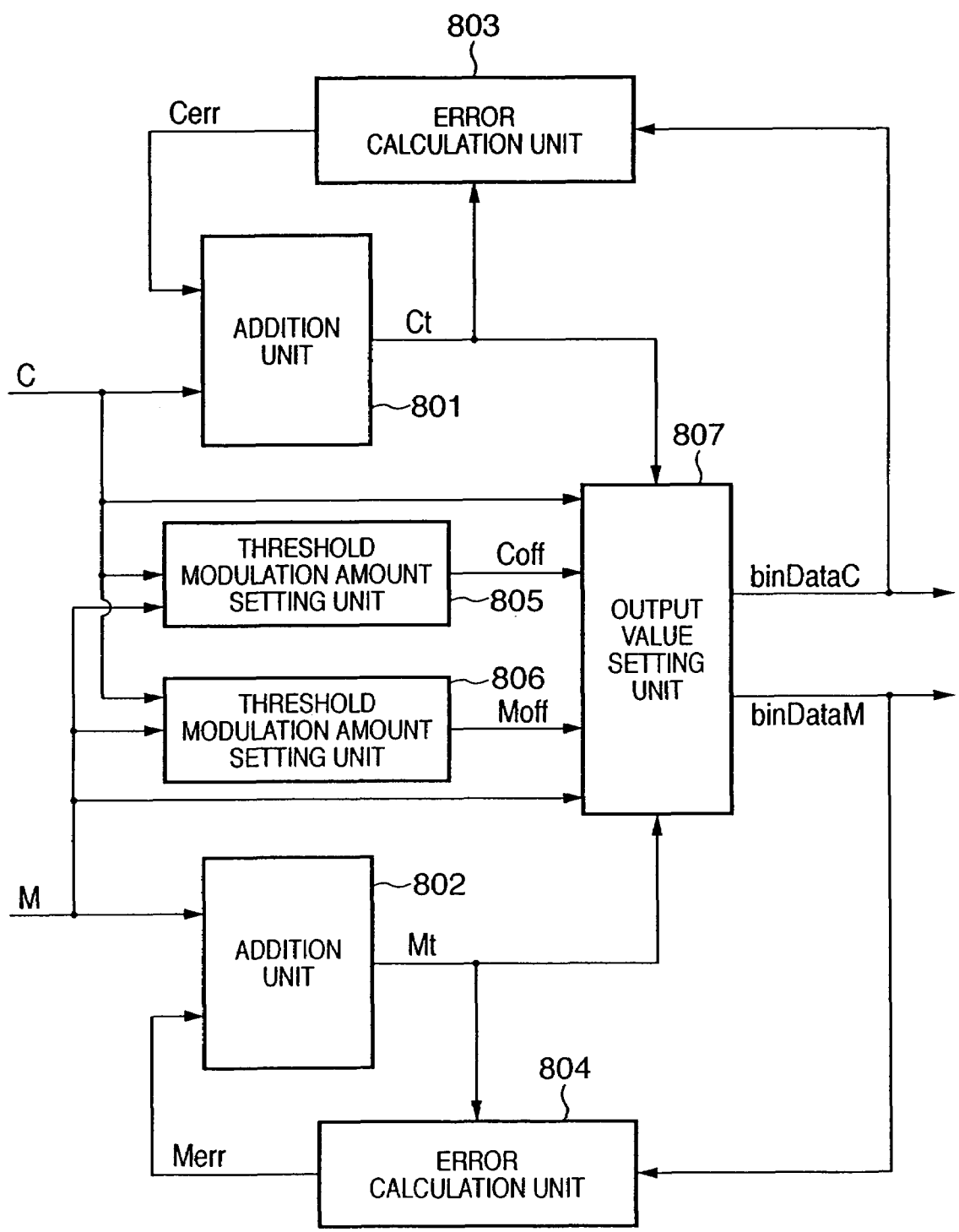
FIG. 22 is a block diagram showing the arrangement of an image processing apparatus according to the first embodiment.

FIG. 22 is a block diagram of a halftoning unit 34 in this embodiment. Although FIG. 22 shows functional blocks, these blocks can be implemented by software as in the prior art.

Referring to FIG. 22, reference symbols C and M denote cyan and magenta input pixel values, respectively, which are input from a color characteristic conversion 33. These input pixel values are input to addition units 801 and 802 for the corresponding color components. Both the pixel values are then input to threshold modulation amount setting units 805 and 806 and an output value setting unit 807.

The addition units 801 and 802 respectively add the input pixel values C and M and quantization errors Cerr and Merr output from error calculation units 803 and 804. Obtained pixel values Ct and Mt are input to the corresponding error calculation units 803 and 804. Both the pixel values are input to the output value setting unit 807.

The threshold modulation amount setting units 805 and 806 output threshold modulation amounts Coff and Moff, which vary quantization thresholds, on the basis of the input pixel values C and M. The output value setting unit 807 determines reference thresholds from the cyan and magenta values (density values) C and M of a target pixel before error diffusion. Thresholds are then determined by varying the reference thresholds using the threshold modulation amounts Coff and Moff. The determined thresholds are compared with the pixel values Ct and Mt after error diffusion to output pixel values binDataC and binDataM. The output pixel values binDataC and binDataM become pixel values after quantization. In this embodiment, these values are binary values. Assume, however, that for the sake of calculation of quantization errors and the like, each value takes any one of "255" to "0". If, for example, a pixel value after quantization is "255", dots of the corresponding colors are formed to form an image.

Figure 23:
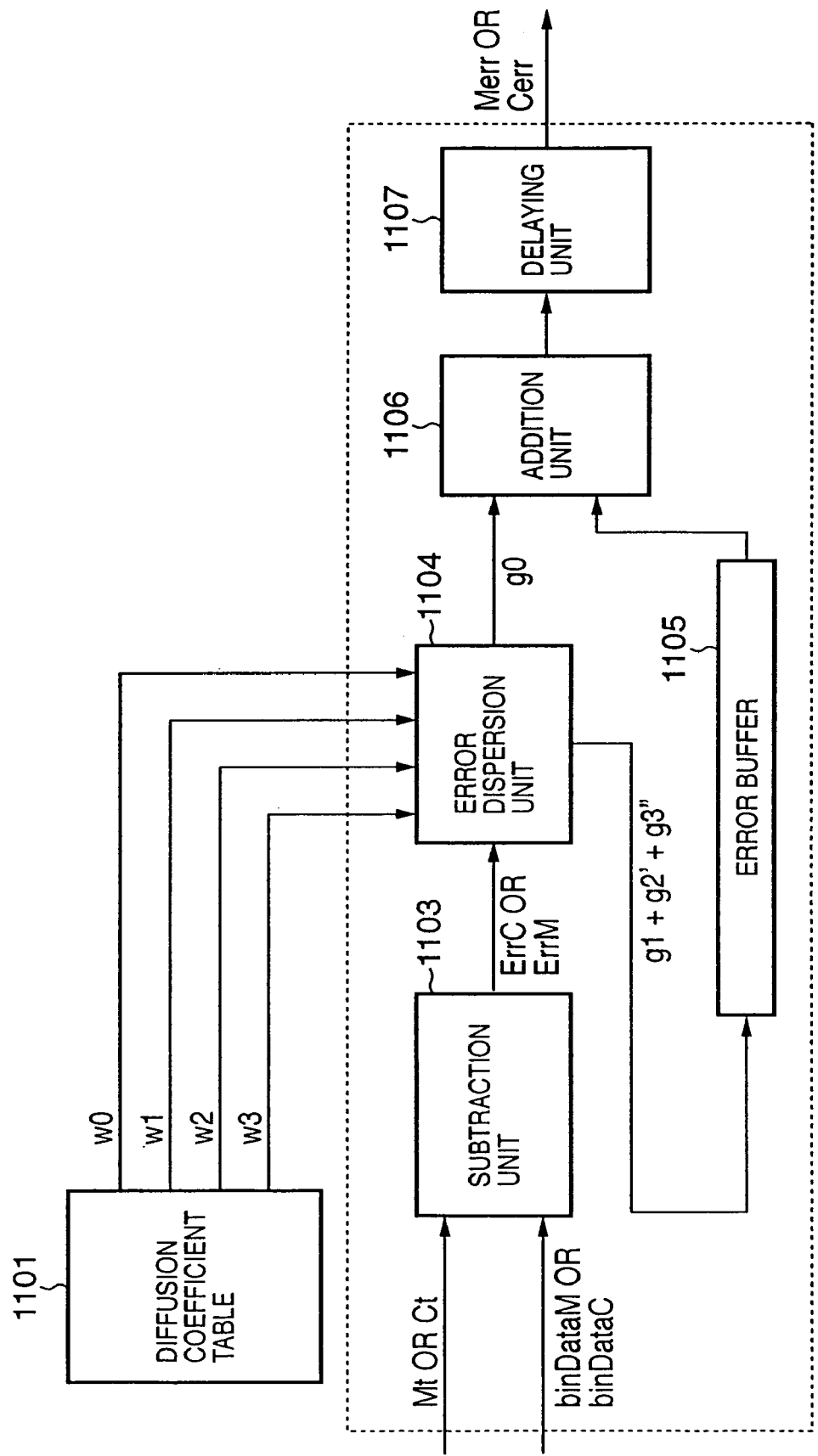
FIG. 23 is a block diagram showing the arrangement of an error calculation unit in the first embodiment.

FIG. 23 is a block diagram for explaining the arrangement of the error calculation units 803 and 804. Since the arrangement shown in FIG. 23 is common to cyan and magenta, the arrangement for cyan will be described as a representative example. First of all, the quantization value binDataC obtained from the output value setting unit 807 is input to a subtraction unit 1103. The subtraction unit 1103 inputs, to an error dispersion unit 1104, an error ErrC obtained by subtracting the quantization value binDataC from the pixel value Ct after error diffusion.

Figure 21:
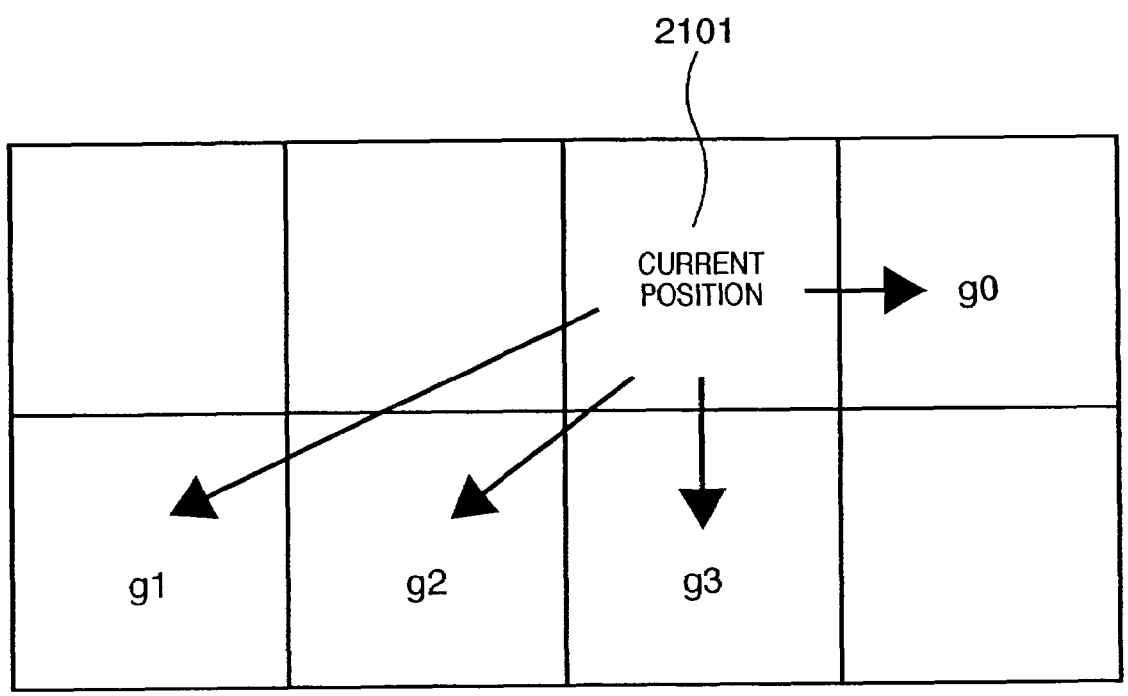
FIG. 21 is a view for a supplementary explanation of FIG. 20.

A diffusion coefficient table 1101 sends preset diffusion coefficient w0, W1, W2, and W3 to the error dispersion unit 1104. FIG. 21 is a view showing the positional relationship between a target pixel 2101 and neighboring pixels to which an error is distributed. With regard to the quantization error ErrC of the target pixel, errors g0, g1, g2, and g3 are respectively distributed to a pixel which will become the next target pixel, a pixel on a line next to the target pixel, which is located two columns before the target pixel, a pixel on the line next to the target pixel, which is located one column before the target pixel, and a pixel located immediately below the target pixel. The error dispersion unit 1104 sequentially performs the following calculations:

$$g3 = ErrC * w3$$

$$g2 = ErrC * w2$$

$$g1 = ErrC * w1$$

$$g0 = ErrC * w0$$

In this case, for example, w0=7/16, w1=1/16, w2=5/16, and w3=3/16 are set as diffusion coefficients. Note, however, that at the start and end of a line, there are no pixels to which errors are to be distributed. For this reason, a weight of 0 is assigned to nonexistent pixels, and special weighting factors are used to distribute corresponding errors to the remaining pixels.

In contrast, consider pixels to which errors are distributed and added. With regard to the target pixel, the errors g0, g1, g2, and g3 are respectively distributed from a pixel immediately before the target pixel, a pixel on a line immediately before the target pixel, which is located two columns after the target pixel, a pixel on the line immediately before the target pixel, which is located on a column next to the target pixel, and a pixel located immediately above the target pixel. Therefore, the error dispersion unit 1104 adds in advance g1 obtained from the target pixel, g2 (g2') obtained from the pixel immediately before the target pixel, and g3 (g3") obtained from the pixel two pixels before the target pixel, and stores the sum in an error buffer 1105 to make a delay of one line. With regard to g2' and g3", g2 and g3 may be temporarily stored in a register or the like such that the processing is delayed by one pixel with respect to g2, and by two pixels with respect to g3. This operation can be implemented by a latch as hardware which is synchronous with pixel clocks. The error buffer 1105 can be realized as a ring buffer having a length of a line. In addition, g0 is output without any change and input to an addition unit 1106.

The addition unit 1106 adds the error g0 and the value of g1+g2'+g3" obtained one line before and read out from the error buffer to calculate the error value Cerr to be added to the pixel next to the target pixel.

Note that the error buffer can be implemented by software in the following manner. Assume that the error buffer has a one-dimensional array represented by errBuf[0 . . . Last] held in the memory. In this case, an array index indicates the position of a pixel on a pixel column of one line. Assume that the position of the target pixel in the main scanning direction is represented by hPos. Note that errBufC[hPos] is read before error dispersion and added to the pixel value C to obtain the pixel value Ct after diffusion.

Errors can also be dispersed to neighboring pixels in the following manner:

errBufC[hPos]←g3 errBufC[hPos−1]←errBufC[hPos−1]+g2 errBufC[hPos−2]←errBufC[hPos−2]+g1 errBufC[hPos+1]←errBufC[hPos+1]+g0

<Processing Sequence in Halftoning Unit>

Figure 24:
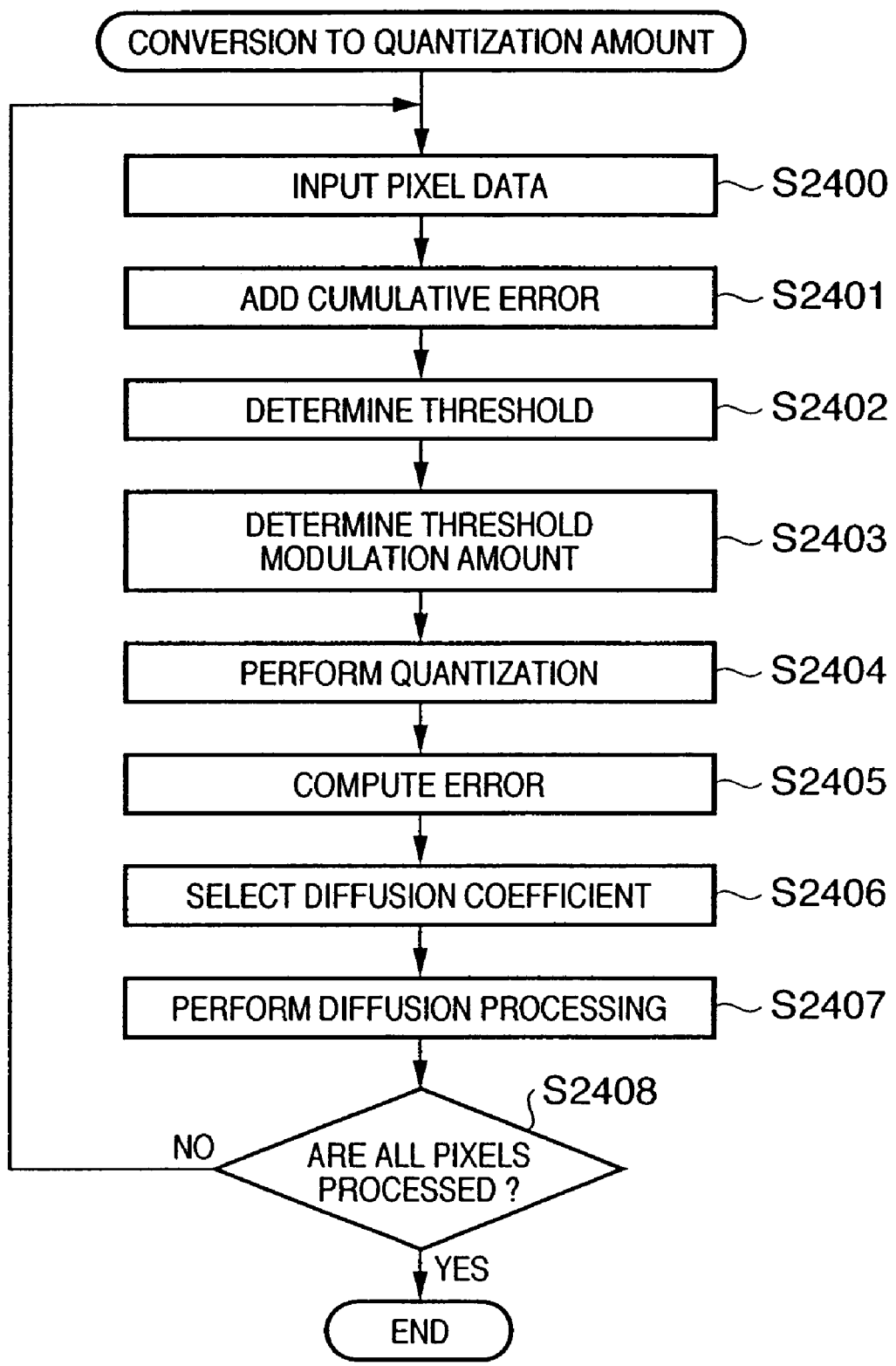
FIG. 24 is a flow chart for explaining processing in a halftoning unit in the first embodiment.

FIG. 24 is a flow chart showing conversion to a quantization amount in step S6 in FIG. 5, i.e., the contents of processing by the halftoning unit 34 in FIG. 4. Note that in this embodiment, attention is given to cyan and magenta, in particular. Yellow and black components may be quantized for the respective colors as in the prior art. Alternatively, all Y, M, C, and K components may be quantized in combination in the manner to be described later.

<Conversion to Quantization Amount (FIG. 24)>

Referring to FIG. 24, pixel data having undergone correction and color conversion in accordance with the color characteristics of the device in step S5 in FIG. 5 is input to the halftoning unit 34 (step S2400). The pixel data is input pixel by pixel, starting from the pixel on the upper left end of an image, in the raster scan order.

A cumulative error value corresponding to a pixel position in a cumulative error memory is added to the input pixel data (step S2401). This processing is performed by the addition units 801 and 802 in FIG. 22. The cumulative error Cerr for cyan is added to the pixel value C of the target pixel. Likewise, the cumulative error Merr for magenta is added to the target pixel value M. As a consequence, Ct and Mt are obtained. When an error buffer errBufc is used, the value of errBufC[hPos] is added to the target pixel value at the position hPos in the horizontal direction.

<Quantization Processing>

Quantization is performed in steps S2402 to S2404. This processing is performed as follows.

1. A reference threshold (Cthreshold) to be used for error diffusion for a C component is obtained on the basis of the density value M of an M component.

2. A threshold modulation amount table like the one shown in FIG. 12 is referred to by using a combination of the density value C of the C component and the density value M of the M component.

3. A correction threshold modulation amount Cthreshold' is determined by adding the threshold modulation amount obtained in the second step to a reference threshold Cthreshold used in error diffusion for the C component.

4. The density Ct of the C component is compared with the correction threshold Cthreshold'. If the density Ct is higher, the quantization value binDataC of the target pixel is set to 255. If the density Ct is lower, the quantization value binDataC is set to 0.

5. A reference threshold (Mthreshold) used for error diffusion for the M component is obtained on the basis of the density value C of the C component.

6. A threshold modulation amount table like the one shown in FIG. 14 is referred to by using a combination of the density value M of the M component and the density value C of the C component.

7. A correction threshold modulation amount Mthreshold' is determined by adding the threshold modulation amount obtained in the sixth step to the reference threshold Mthreshold used for error diffusion for the M component.

8. The density value Mt of the M component is compared with the correction threshold Mthreshold'. If the density Mt is higher, the quantization value binDataM of the target pixel is set to 255. If the density Mt is lower, the quantization value binDataM is set to 0.

The first to fourth steps are processing for cyan. The fifth to eighth steps are processing for magenta. Referring to FIG. 24, however, since data of all the colors are concurrently processed, the first and fifth steps are performed in step S2402 in FIG. 24, the second and sixth steps are performed in step S2403 in FIG. 24, and the third, fourth, seventh, and eighth steps are performed in step S2404 in FIG. 24.

In step S2402 in FIG. 24, reference thresholds are acquired for cyan and magenta, respectively. The reference thresholds are obtained by referring to the conversion table shown in FIG. 6 or a threshold table provided on the basis of the conversion table. Note that step S2402 is performed by the output setting unit 807 in FIG. 22.

Figure 6:
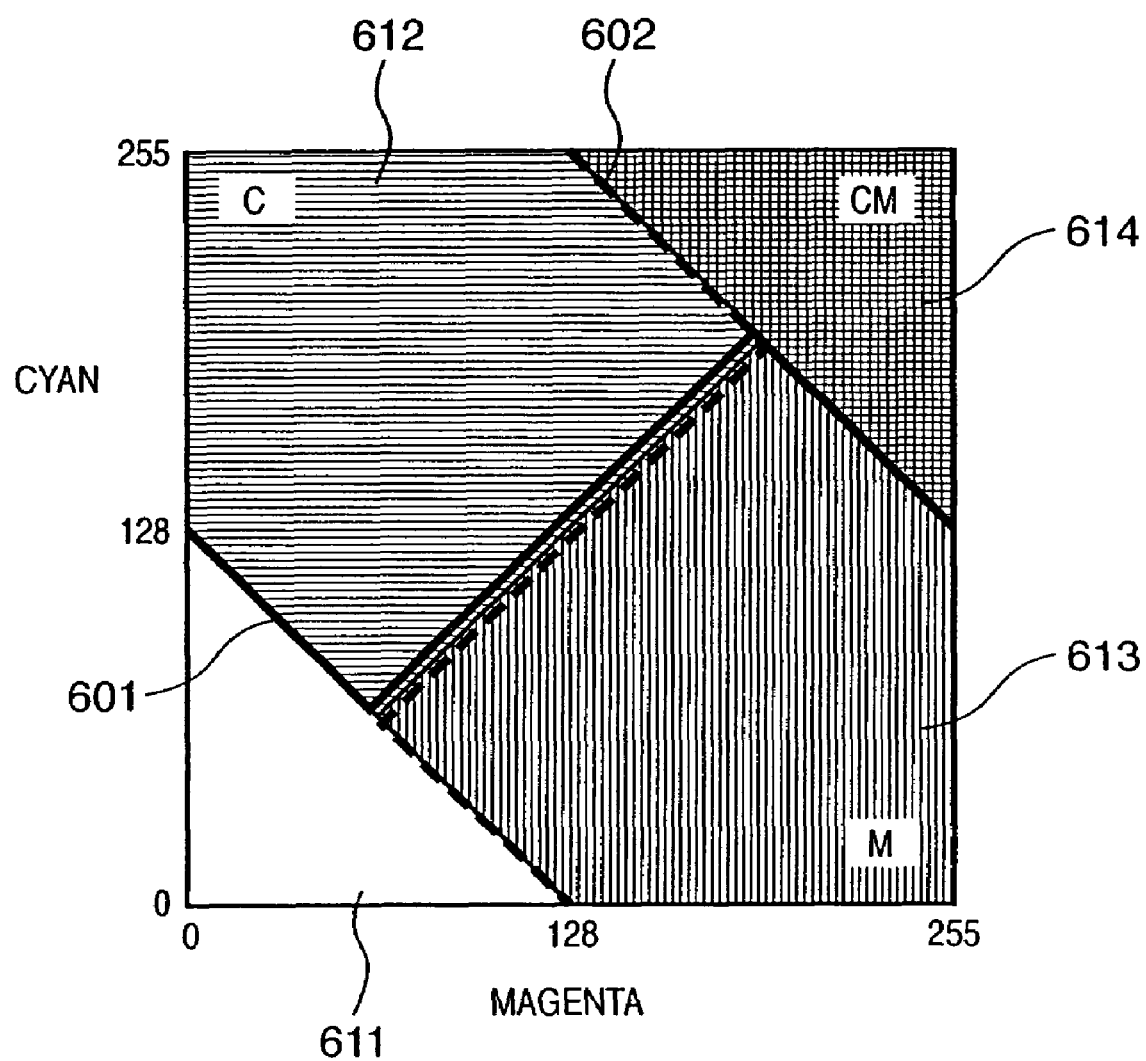
FIG. 6 is a view showing an example of the error diffusion scheme of performing control to prevent inks of two colors from overlapping each other.

FIG. 6 is a table for quantizing the sum of the values of cyan and magenta components by using 128 and 384 as thresholds. In this table, if the sum of the values of the cyan and magenta components is 128 or less, both the cyan and magenta components are converted into 0. If the sum is larger than 384, both the cyan and magenta components are converted into 255. If the sum of the values of the cyan and magenta component is larger than 128 and equal to or less than 384, the value of the cyan component is compared with the value of the magenta component. The color component with a larger value is converted into 255. The color component with a smaller value is converted into 0. If they are equal to each other, for example, they are properly converted so as to be evenly dispersed.

Alternatively, the table shown in FIG. 6 can be directly used as a conversion table. In this case, the table is converted into a numerical form that can be stored in the computer memory, as follows. The table shown in FIG. 6 is a two-dimensional table having the values of cyan and magenta components as indexes. A combination of binary values (cyan and magenta) is determined in accordance with an index. Referring to FIG. 6, (0, 0) represents an output in an area 611; (1, 0), an output in an area 612; (0, 1), an output in an area 613; and (1, 1), an output in an area 614.

In this case, a line 601 represents a reference threshold for cyan. The threshold is not constant and changes in accordance with the value of a magenta component. Referring to FIG. 6, the line 601 delimits the lower half area constituted by the areas 611 and 613 from the upper half area constituted by the areas 612 and 614. The value of the cyan component corresponding to the intersection of the value of the magenta component M of the target pixel and the line 601 becomes the reference threshold Cthreshold for the cyan component. If a table in which the values of cyan and magenta components corresponding to the line 601 are made to correspond to each other is created in advance, the reference threshold Cthreshold can be easily obtained by referring to the table.

A dotted line 602 in FIG. 6 represents a reference threshold for magenta. Referring to FIG. 6, the dotted line 602 delimits the left half area constituted by the areas 611 and 612 from the right half area constituted by the areas 613 and 614. The reference threshold Mthreshold for a magenta component can be determined in the same manner as described above except that magenta is substituted for cyan in the above description.

Figure 13:
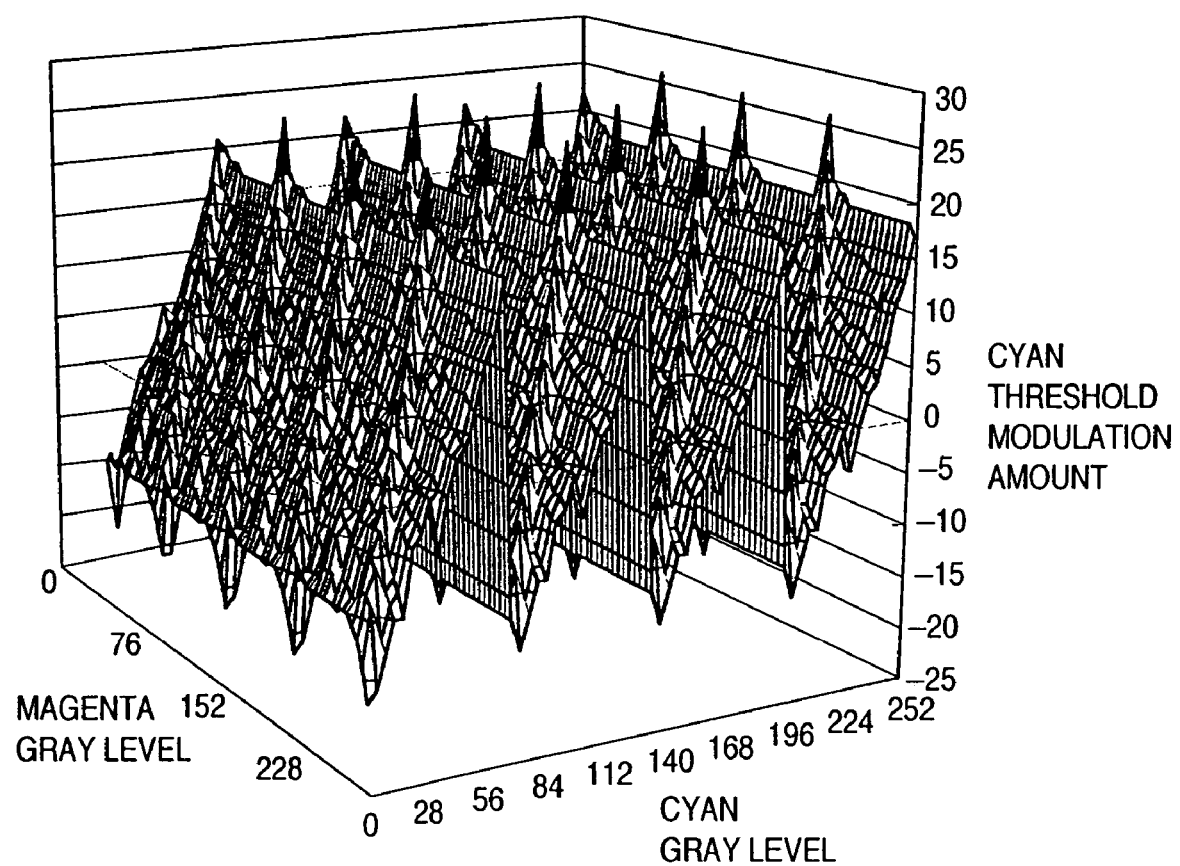
FIG. 13 is a graph representing the overall table including omitted threshold modulation amounts in FIG. 12.
Figure 15:
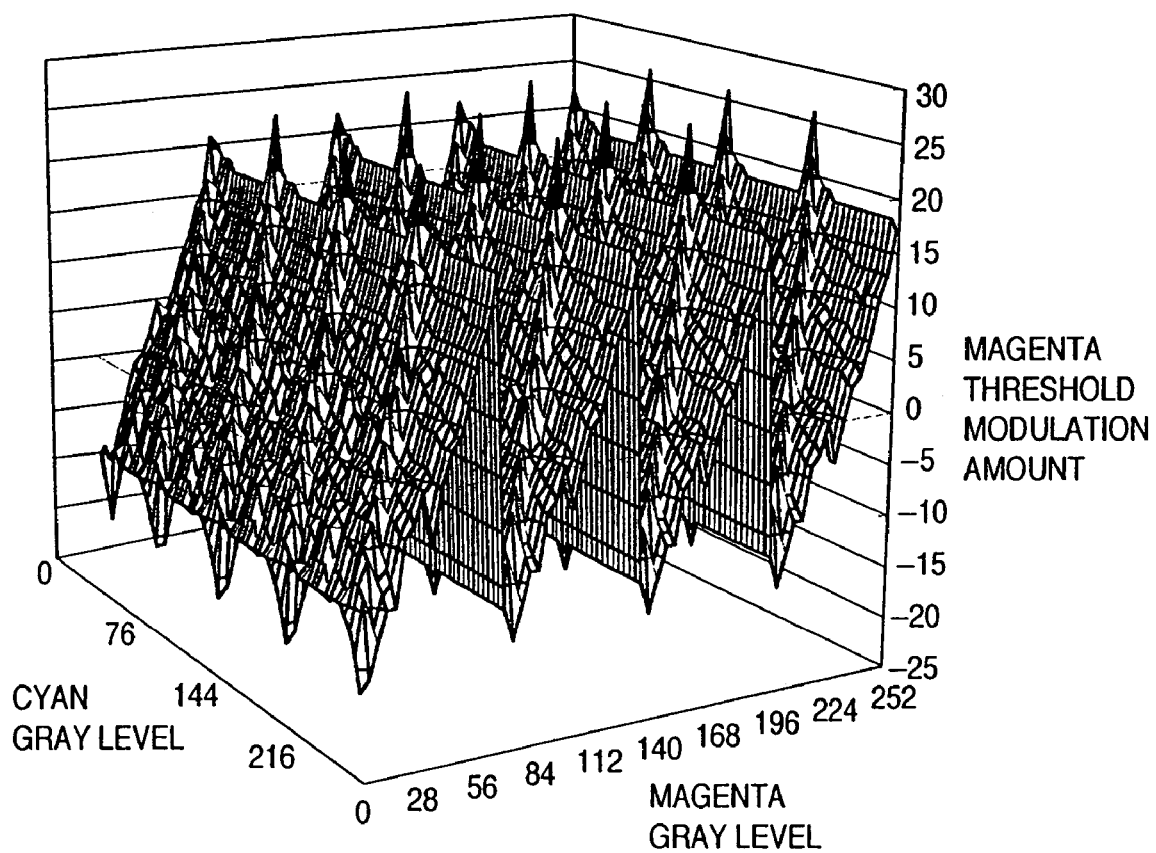
FIG. 15 is a graph representing the overall table including omitted threshold modulation amounts in FIG. 14.

In step S2043, the threshold modulation amount setting units 805 and 806 select the threshold modulation amounts Coff and Moff for the C and M components, respectively. For example, threshold modulation amounts are given for cyan components as shown in FIG. 12, and for magenta components as shown in FIG. 14. That is, threshold modulation amounts are determined for the respective colors by using the values C and M of the cyan and magenta components of a target pixel as indexes. If, for example, the cyan and magenta component values of the target pixel are 7 and 4, respectively, the threshold modulation amount Coff for cyan is −8 as obtained by referring to FIG. 12. This table is provided in advance, and the manner of determining values for the table will be described later. A threshold modulation amount for a magenta component can be determined in the same manner as descried above except that the table shown in FIG. 14 is to be referred to. Note that FIGS. 13 and 15 are graphs representing the tables shown in FIGS. 12 and 14.

Note that methods of referring to threshold modulation amounts include a method of extracting the density values of cyan and magenta components from at least one pixel of a target pixel and neighboring pixels and referring to the table by using the average of the density values as an index as well as a method of using the value of a target pixel itself as an index. According to this method, even if a target pixel has a value considerably different from the values of neighboring pixels, a threshold modulation amount can be determined by referring to the values of the neighboring pixels. Neighboring pixels are preferably selected such that no significant delay occurs in processing and selected pixels have a certain range. For example, three pixels including two adjacent pixels or 3×3 pixels centered on a target pixel may be selected.

Subsequently, a quantization unit 103 determines values after quantization by using the target pixel data Ct and Mt after cumulative error addition, the threshold modulation amounts Coff and Moff selected in step S2403, and the reference thresholds Cthreshold and Mthreshold (step S2404). Values after quantization are determined on the basis of the following rule:

If $C$threshold+$C$off$\geq Ct$, then binData$C \leftarrow 0$

If $C$threshold+$C$off$<Ct$, then binData$C \leftarrow 255$

If $M$threshold+$M$off$\geq Mt$, then binData$M \leftarrow 0$

If $M$threshold+$M$off$<Mt$, then binData$M \leftarrow 255$

In the above sequence, the C and M components of the target pixel are binarized and input to a print command generating unit 35 in FIG. 4. The halftoning unit also binarizes the remaining color components such as Y and K components. These remaining color components may be binarized in the same sequence as described above. Alternatively, binarization may be performed by using the conventional technique of binarizing each color component by performing error diffusion processing independently for each color.

A print command generated by the print command generating unit is spooled and sent to the printer to print out a corresponding image. The arrangement of the printer will be described later.

<Setting of Threshold Modulation Amount Table>

A method of setting the threshold modulation amount tables shown in FIGS. 12 and 14 will be described next. Assume that the cyan component value of a pixel is represented by C, and the magenta component value is represented by M.

In this case, in the field of (C0, M0) in the threshold modulation amount table, the value obtained by inverting the sign of the average quantization error when the image data of the uniform density (C0, M0) is quantized by the arrangements shown in FIGS. 22 and 23 with a threshold modulation amount of 0 is stored.

Figure 25:
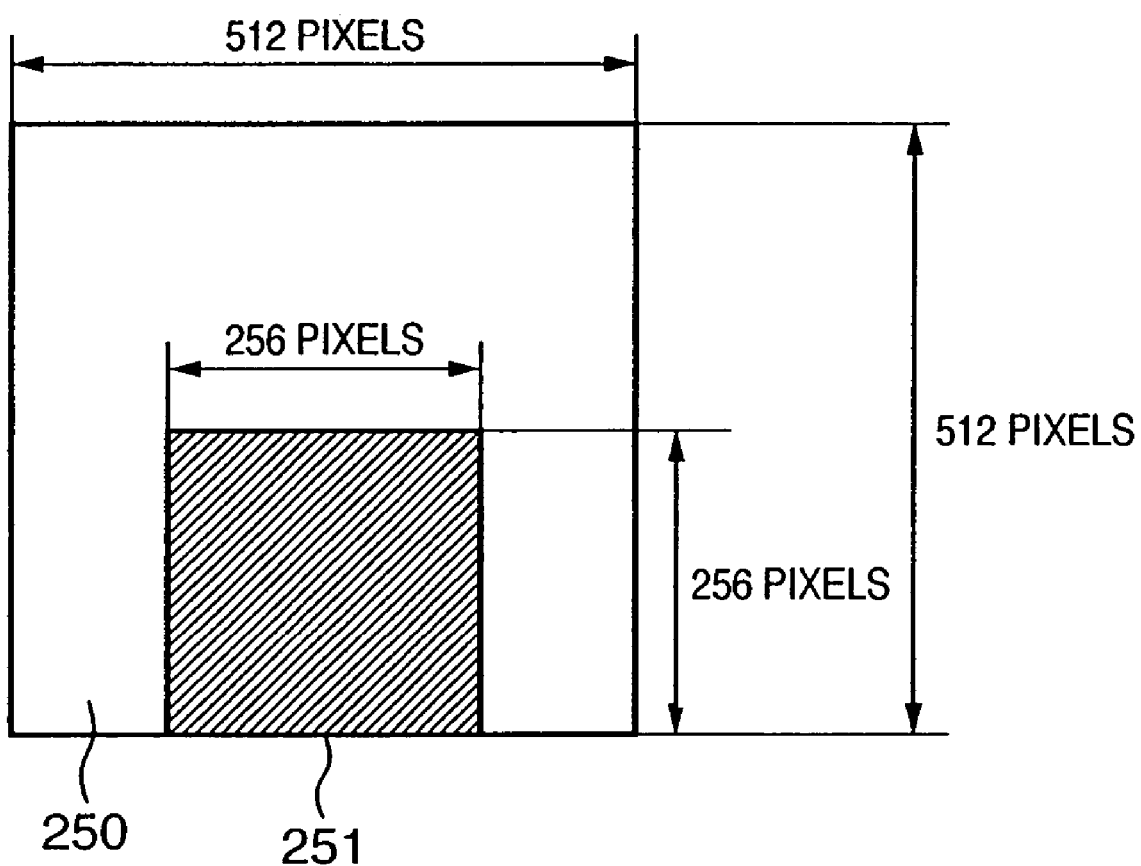
FIG. 25 is a view showing an example of an image used for computations of an average quantization error and evaluation value.

FIG. 25 is a view showing an example of the image used for the calculation of an average quantization error. Referring to FIG. 25, an area 250 is an image area of 512×512 pixels subjected to binarization processing, and an area 251 is an image area of 256×256 pixels for which an average quantization error is to be calculated. Since different diffusion coefficients are set on the left and right ends of the image, errors are diffused differently from those in an area near the center. In addition, since quantization is started in the upper portion of the image area from a state wherein no quantization errors are diffused from neighboring pixels, the state of error diffusion in the upper portion also differs from that in the area near the center. For this reason, an area below the center, which is robust against the influences of peripheral portions, is set as an area to be evaluated.

Figure 26:
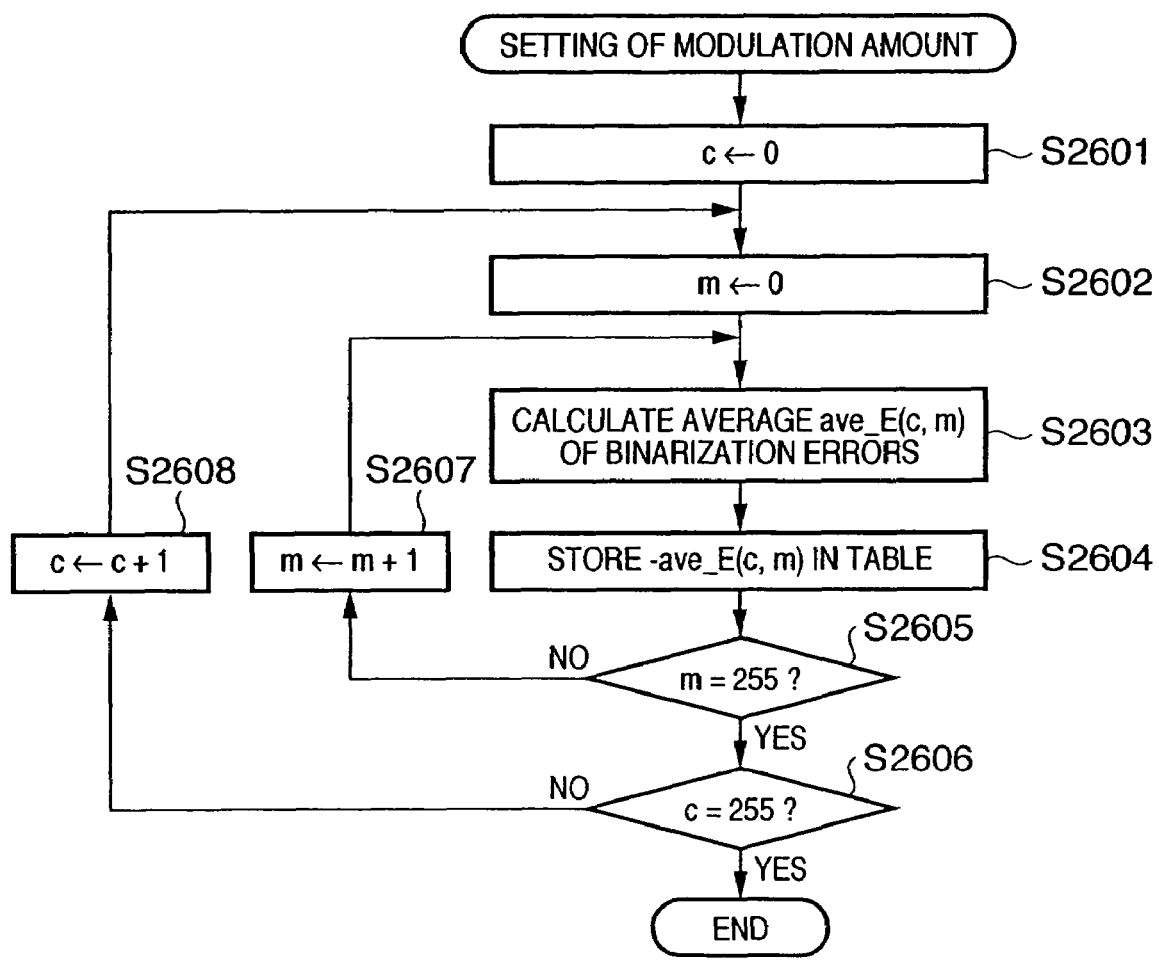
FIG. 26 is a flow chart for explaining a sequence for generating a threshold modulation amount.

FIG. 26 is a flow chart showing a sequence for creating a threshold modulation amount table. Note that all the contents of the threshold modulation amount able are filled with 0, and the threshold modulation amount table is not directly rewritten in the sequence shown in FIG. 26. When a temporary table is created and all values are determined, the values are copied to the threshold modulation table. Referring to FIG. 26, attention is given to only cyan and magenta components.

With regard to the uniform area 250 of 512×512 pixels shown in FIG. 25, gray levels are set to c (cyan)=0 and m (magenta)=0 (steps S2601 and S2602). Quantization processing is then performed for this image data in the above sequence (FIG. 24) to obtain an average ave_E(c, m) of quantization errors (step S2603). Scanning of the image is started from the pixel on the upper left end of the image area, and binarization processing is performed toward the pixel on the lower right end of the image in the raster scan order.

With regard to each pixel of the image area 251 of 256×256 pixels near the lower end of the image, in which the formation of dots is expected to have reached a stable state, the quantization error obtained by subtracting the cyan component value Ct after cumulative error addition from the output value binDataC is integrated. The resultant value is then divided by the total number of pixels, i.e., 256×256, in the area 251. The resultant value is the average quantization error ave_E(c, m) with respect to the pixel having the cyan component value c and the magenta component value m.

A value −ave_E(c, m) obtained by inverting the sign of the average quantization error ave_E(c, m) is set in the field defined by the cyan component value c and the magenta component value m in the table (step S2604).

With this operation, with regard to the cyan component value c, an entry is determined for the threshold modulation table when the magenta component is m. The image is then quantized by changing the value of m one by one to 255 while fixing the cyan component c, thereby determining threshold modulation amounts (steps S2605 and S2607).

In addition, average quantization errors are calculated by quantizing the image while increasing the cyan component c one by one in the same sequence as described above, thereby determining threshold modulation amounts (steps S2606 and S2608).

In the above sequence, a threshold modulation amount table for cyan components is created. A threshold modulation amount table for magenta components is also created in the same sequence. Note that in performing the above sequence for magenta components, the above sequence is repeated for pixels with the same values as those in the calculation for cyan components. For this reason, the contents of the created table are the same as those for cyan components. Therefore, the table created for cyan can be used for magenta. In this case, the threshold modulation amount setting units 805 and 806 in the arrangement shown in FIG. 22 can share a threshold modulation amount table. However, since a target component changes from a cyan component to a magenta component, indexes for cyan and magenta must be interchanged when the table is to be referred to.

In general, a dot formation delay occurs at a gray level where the average quantization error ave_E(c, m) is not 0. In this embodiment, therefore, a threshold for quantization is varied to set all average quantization errors ave_E(c, m) to 0 at all input gray levels. A so-called false edge phenomenon can be prevented by reducing dot formation delays using the above sequence.

Comparison between Embodiment and Known Techniques

According to Japanese Patent Laid-Open No. 2000-354172 as a known technique, in order to prevent cyan and magenta dots from overlapping each other, the sum of cyan and magenta component values is used as a parameter for the determination of a threshold modulation amount. This is a method specialized into an error diffusion method of regarding cyan and magenta as shown in FIG. 6 as the same color and converting the sum of the respective color component values into a ternary value.

Figure 7:
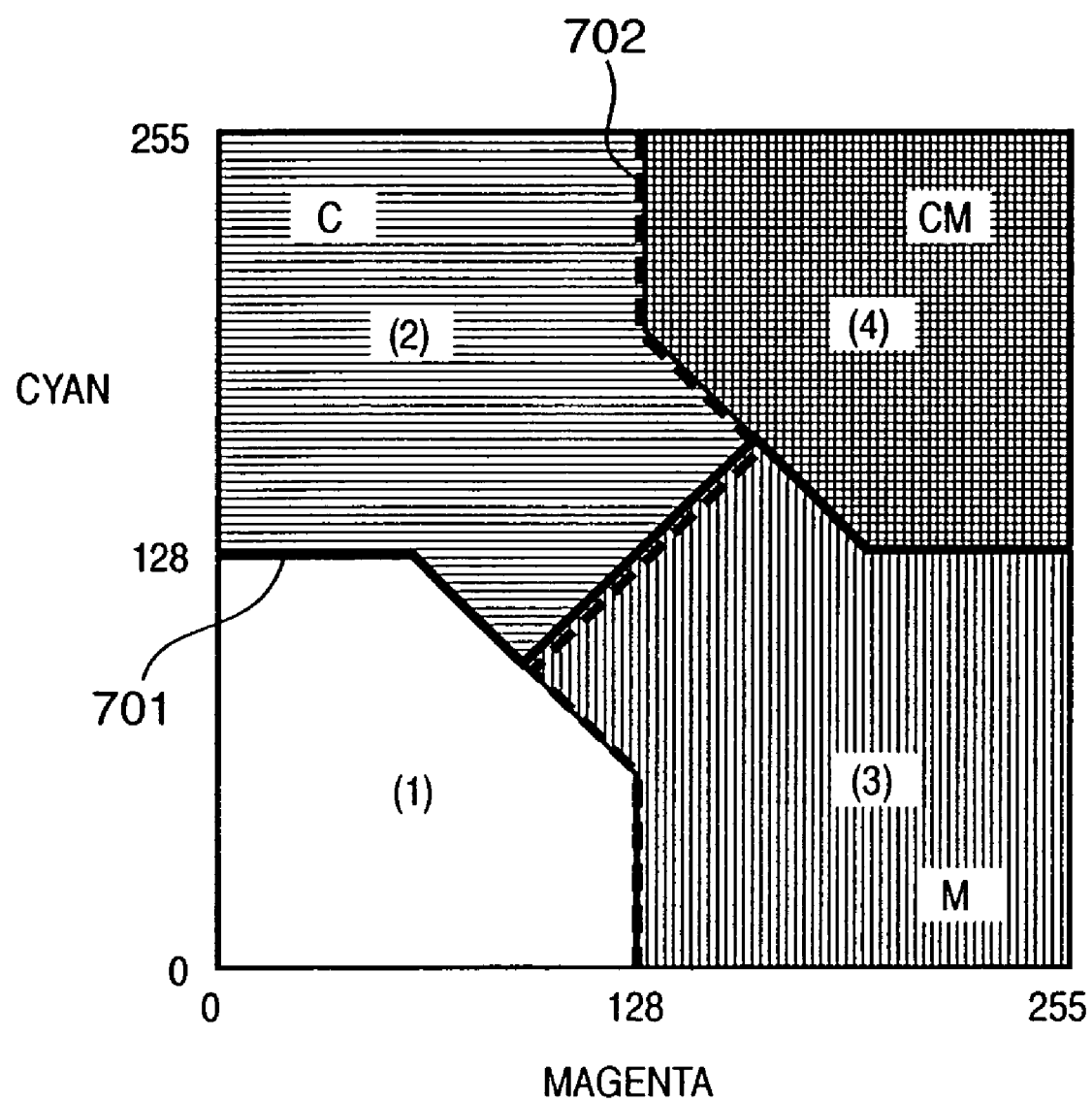
FIG. 7 is a view showing another example of the error diffusion scheme of performing control to prevent inks of two colors from overlapping each other.
Figure 8:
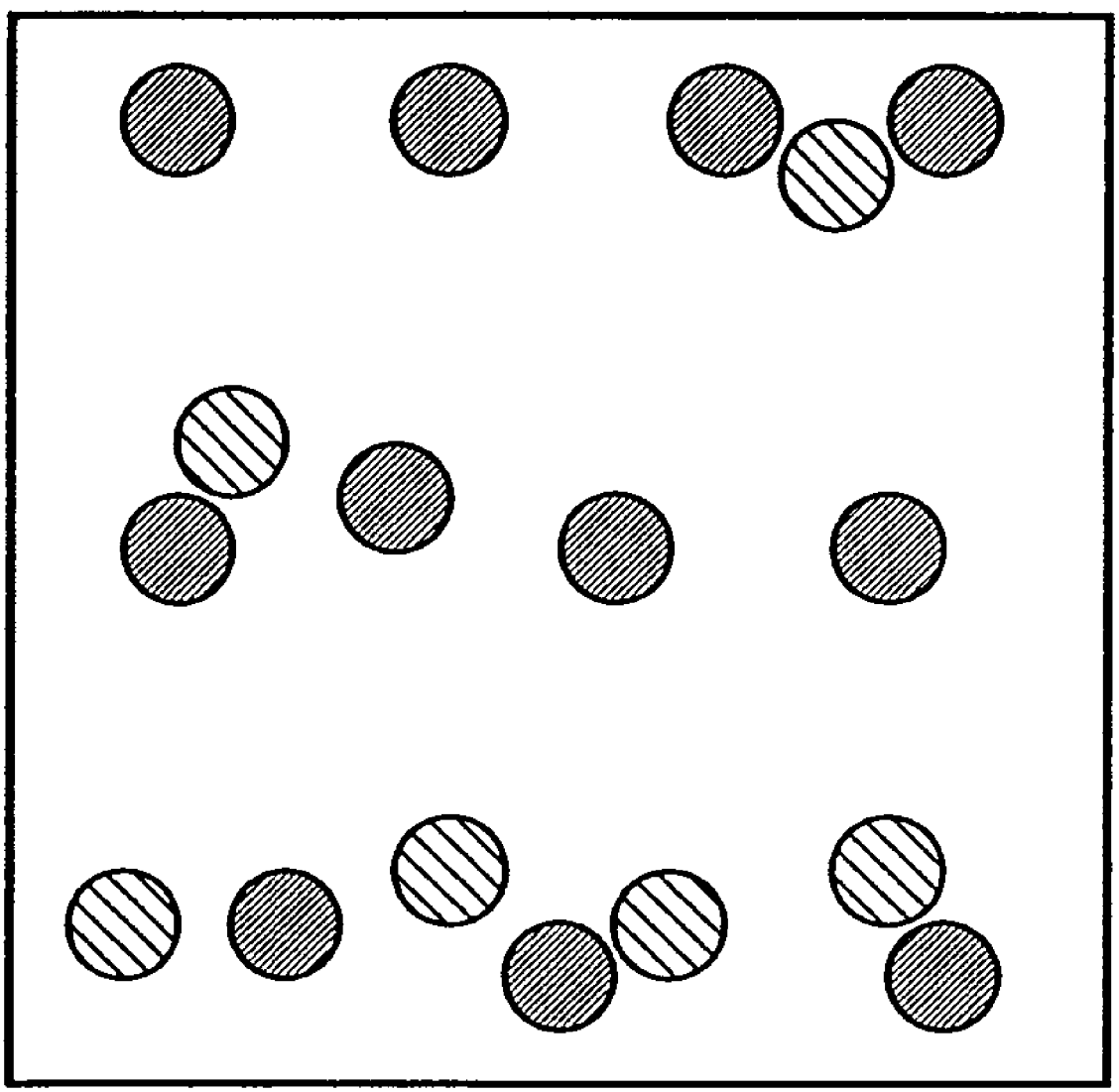
FIG. 8 is a view showing an example of how dots are chained to each other.

As a method of setting thresholds for the respective colors in the error diffusion method of preventing dots of a plurality of colors from overlapping each other, which is an object of the present invention, a method of making settings for nonlinear conversion like that shown in FIG. 7 is available as well as the method shown in FIG. 6. Assume that a threshold modulation amount set for the sum of cyan and magenta component values as disclosed in Japanese Patent Laid-Open No. 2000-354172 is applied to a case wherein a threshold curve is discontinuous and nonlinear as shown in FIG. 7. In this case, for example, dots are undesirably chained to each other as shown in FIG. 8.

Assume that a threshold modulation amount set on the basis of only the density value of a target color is used on the basis of an error diffusion halftoning method using a threshold modulation amount set on the basis of the density value of a target color of a target pixel as disclosed in Japanese Patent Laid-Open Nos. 08-307669 and 08-307680. In this case, landing of dots is excessively promoted or suppressed depending on the combination of cyan and magenta components. In this case as well, chaining of dots as shown in FIG. 8 or the like occurs.

Figure 9:
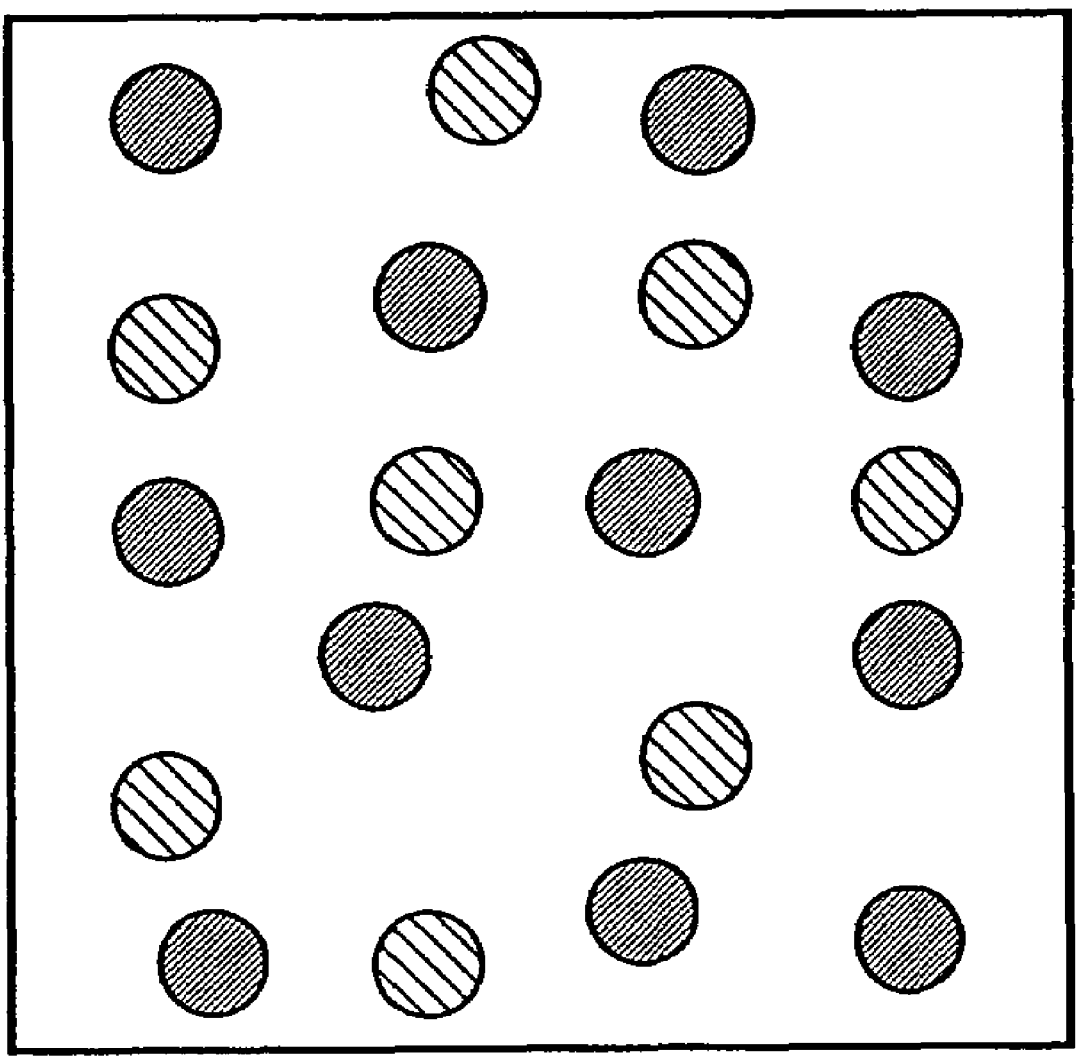
FIG. 9 is a view showing an example of proper false edge improvement for two colors.
Figure 10:
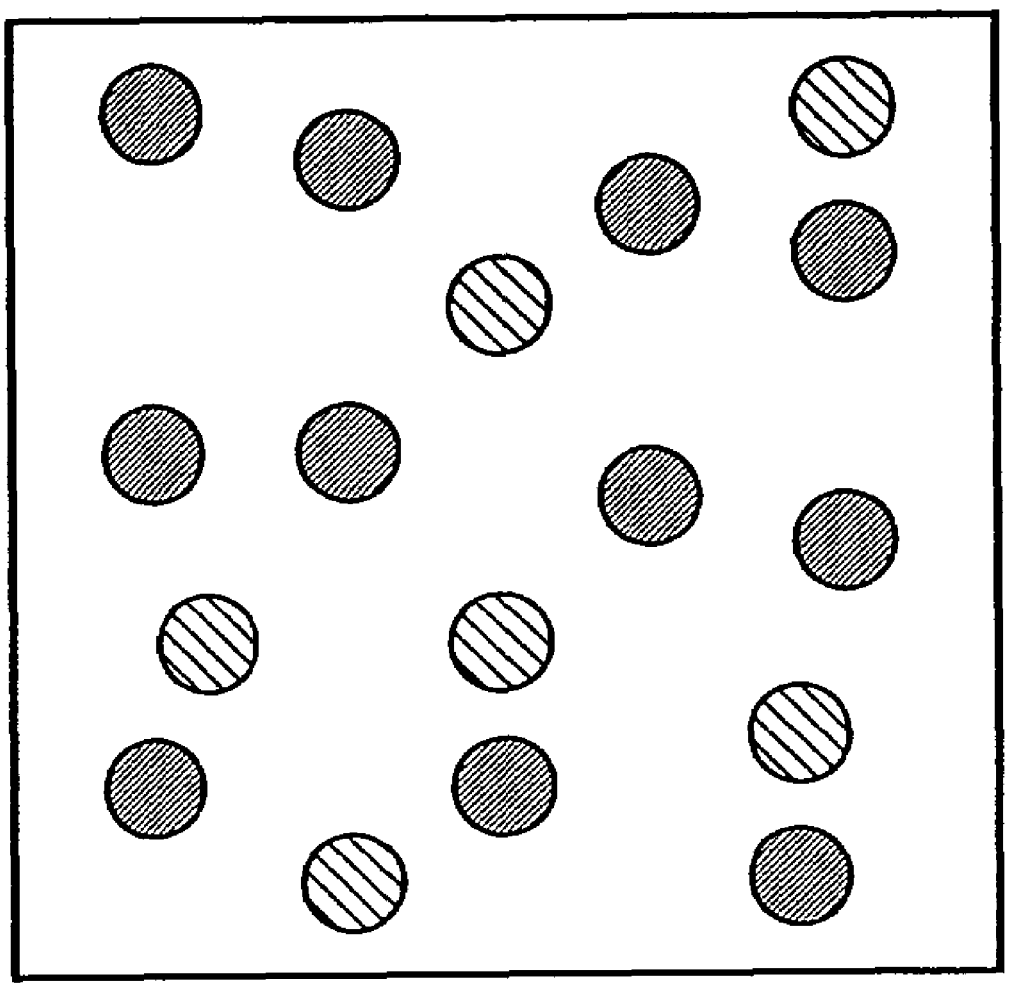
FIG. 10 is a view showing an example of poor dot dispersion properties in two-color print operation.

In contrast, this embodiment has robustness against various kinds of threshold forms, i.e., stably exhibits the effect of preventing the above problems even with changes in the manner of setting thresholds. More specifically, the problem of false edge can be properly prevented as shown in FIG. 9.

In addition, a threshold modulation amount can be quickly extracted by referring to the table using only cyan and magenta component values.

As indexes for reference to a threshold modulation amount, not only the value of a target pixel itself but also the sum, average, maximum value, or minimum value of the color components of the target pixel and neighboring pixels (target pixel group) can be used.

When the sum of the respective color components of a target pixel group is used, each feature amount of cyan and magenta in a local area can be quickly obtained.

When the average of the respective color components of the target pixel group is used, each feature amount of cyan and magenta in the local area can be expressed in a small data size, and feature amounts can be extracted with higher robustness against the influences of locally added noise. For this reason, a threshold modulation amount can be determined in accordance with the characteristics of the local area. With regard to an image containing many high-frequency spatial frequency components as well, a high-quality binary image for which a false edge phenomenon is prevented can be obtained.

There is also available a method of obtaining a threshold modulation amount with reference to the maximum value of the respective color components in a target pixel group. In this case, a dominant component of each color component can be extracted and used. That is, false edge improvement can be preferentially made for the dominant component.

In contrast, there is available a method of using a threshold modulation amount corresponding to the minimum value of each color component in a target pixel group. In this case, a weak component of the respective color components, cyan and magenta components in this case, can be extracted. With this operation, in an area where one color component is a shadow, and the other color component is a highlight, false edge improvement can be preferentially made for the highlight color component.

In this embodiment, the sequence of quantizing a multilevel image into a binary image has been described. However, the embodiment can also be applied to a case wherein a multilevel image is converted into data with a small number of gray levels, e.g., ternary or quaternary multilevel image data. In this case, obtained multilevel image data may be output without any change or can be binarized by, for example, making each value correspond to a dot pattern.

Modification to First Embodiment

The relationship between a pixel value and a threshold in quantization processing is relative. If, therefore, the two values are varied by the same value, the quantization result is free from the influences of a variation in quantization error. For this reason, the same effects as those described above can be obtained even if the pixel value is varied instead of the threshold as in the above embodiment. In this case, however, a threshold modulation amount table becomes a density value modulation amount table, and its contents become identical to the average quantization errors obtained in step S2103 in FIG. 21. In the arrangement shown in FIG. 22, the outputs Coff and Moff from the threshold modulation amount setting units 805 and 806 are respectively input to the addition units 801 and 802, and the cumulative errors Cerr and Merr are respectively added to the pixel values C and M.

An outline of this processing will be described below.

1. A threshold (Cthreshold) to be used for error diffusion for the C component is obtained on the basis of the density value M of the M component.

2. A density modulation amount table like the one shown in FIG. 16 is referred to by using a combination of the density values C and M of the C and M components.

3. The density modulation amount obtained in the second step is added to the density Ct of the C component to determine a correction density Ct' for the C component.

4. The correction density Ct' for the C component is compared with the threshold Cthreshold. If the correction density Ct' is higher, output operation is performed with C ink.

5. A threshold (Mthreshold) to be used for error diffusion for the M component is obtained on the basis of the density value C of the C component.

6. A density modulation amount table like the one shown in FIG. 18 is referred to by using a combination of the density values M and C of the M and C components.

7. The density modulation amount obtained in the sixth step is added to the density Mt of the M component to determine a correction density Mt' for the M component.

8. The correction density Mt' for the M component is compared with the threshold Mthreshold. If the correction density Mt' is higher, output operation is performed with M ink.

Figure 17:
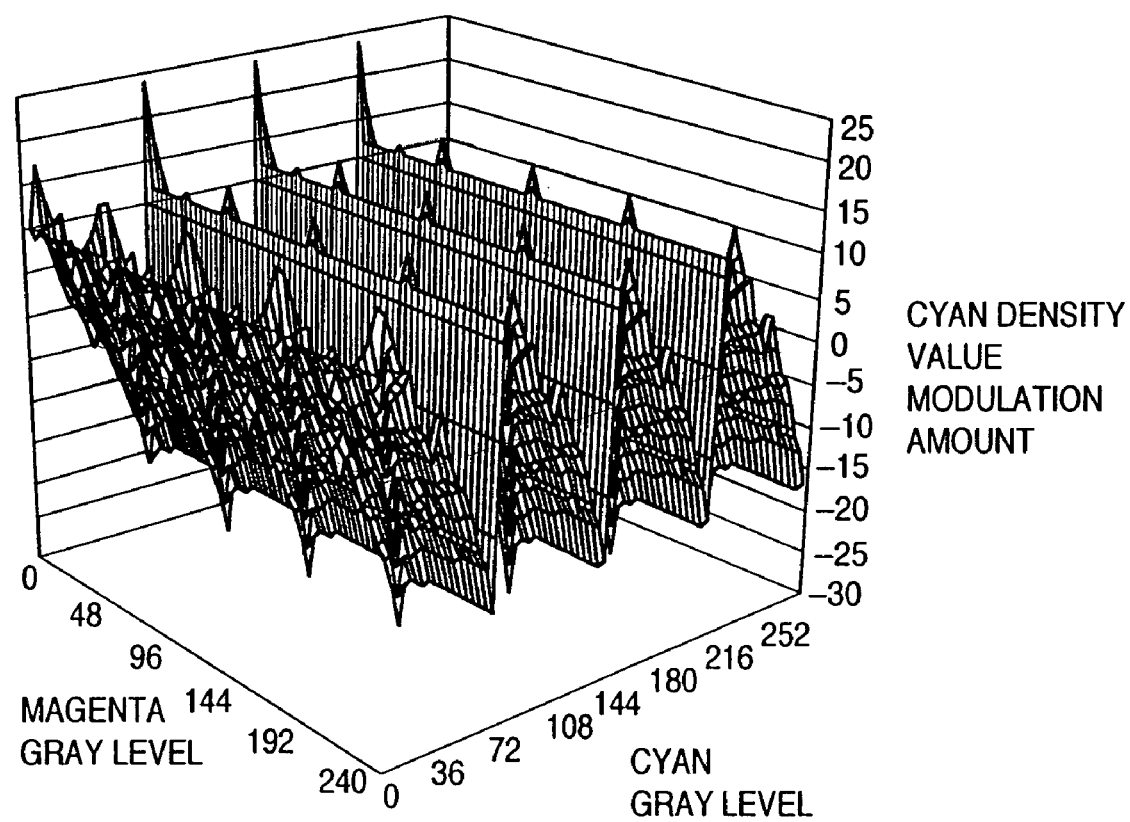
FIG. 17 is a graph representing the overall table including omitted density value modulation amounts in FIG. 16.
Figure 19:
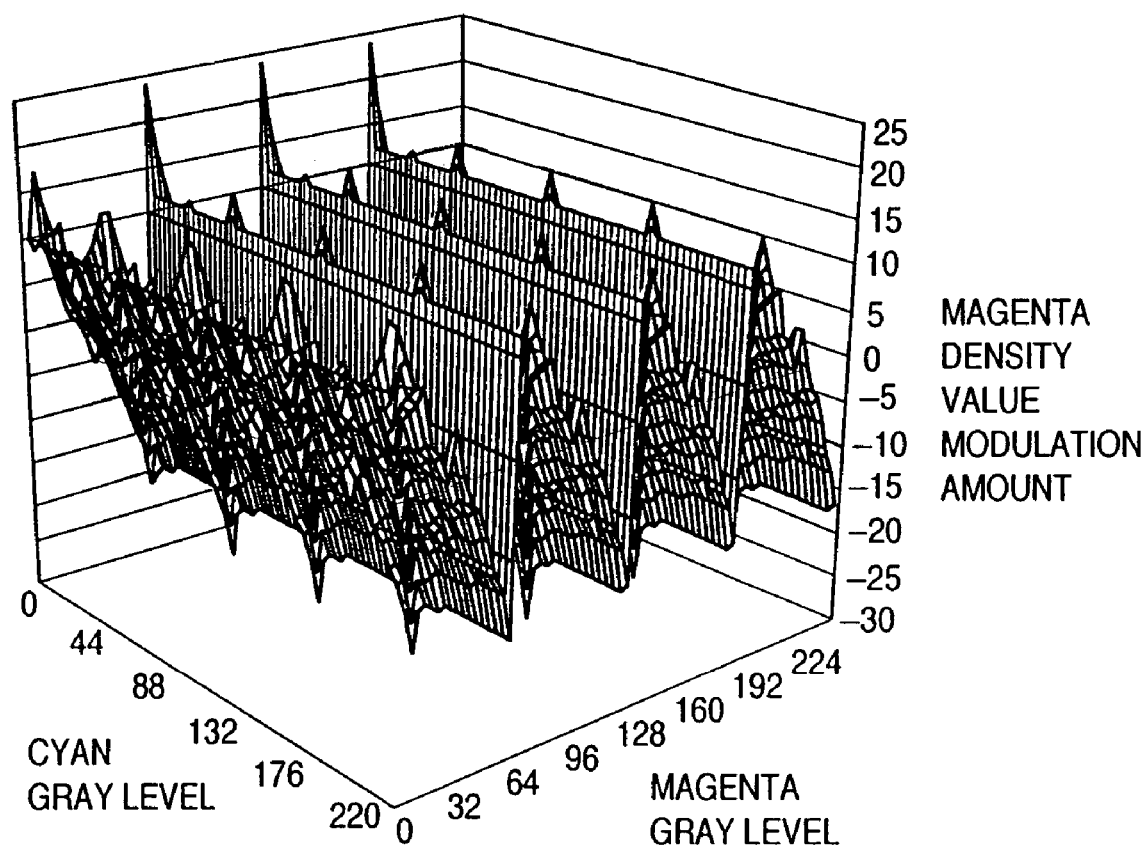
FIG. 19 is a graph representing the overall table including omitted density value modulation amounts in FIG. 18.

Note that FIGS. 17 and 19 are graphs representing the tables shown in FIGS. 16 and 18.

In addition, difference in color account for at least one of differences in dye used for printing by a printing apparatus, dye concentration, and discharge amount.

Second Embodiment

The first embodiment has exemplified the embodiment of setting and using threshold modulation amounts and density value modulation amounts for false edge improvement as a two-dimensional array based on cyan and magenta or an array using computation outputs. An embodiment for improving dot dispersion properties will be described next. Note that this embodiment differs from the first embodiment only in halftoning (binarization) processing, and hence only different points will be described. The different points are the methods of determining threshold modulation amounts in step S2403 in FIG. 24 and that dispersion coefficients are selected in step S2406 in the following sequence.

In this embodiment, dot dispersion properties are improved by using error diffusion coefficients based on the density values of C and M components of a target pixel for the formation of C and M images as shown in FIG. 6. Image formation control is performed in the following sequence.

1. A threshold (Cthreshold) to be used for error diffusion of the C component is obtained on the basis of a density value M of the M component.

2. A density Ct of the C component is compared with the threshold Cthreshold. If the density Ct is higher, output operation is performed with C ink.

3. An error diffusion coefficient table like the one shown in FIG. 20 is referred to by using a combination of the C and M components.

4. A quantization error is diffused to neighboring pixels, which have not been quantized, by using the error diffusion coefficient obtained in the third step.

5. A threshold (Mthreshold) to be used for error diffusion of the M component is obtained on the basis of a density value C of the C component.

6. A density Mt of the M component is compared with the threshold Mthreshold. If the density Mt is higher, output operation is performed with M ink.

7. An error diffusion coefficient table like the one shown in FIG. 21 is referred to by using a combination of the M and C components.

8. Quantization errors are diffused to neighboring pixels, which have not been quantized, by using the error diffusion coefficient obtained in the seventh step.

In the sequence shown in FIG. 24, the respective color components are concurrently processed, and hence the first to fourth steps and fifth to eighth steps are concurrently performed. In this embodiment, an error diffusion coefficient table to be referred to is formed from a two-dimensional array constituted by combinations of cyan and magenta component values or an array having, as offsets, computation outputs obtained by performing a predetermined computation for combinations of two colors, i.e., combination colors. However, similar processing can performed for other combinations.

When, for example, error diffusion processing is performed for a highlight image by a conventional method as disclosed in Japanese Patent Laid-Open No. 2000-354172, dot dispersion properties in particular tend to deteriorate. When an error diffusion coefficient to be used for a target pixel is determined with respect to the sum of cyan and magenta component values as in Japanese Patent Laid-Open No. 2000-354172, dot dispersion properties deteriorate in an image area where a cyan portion is a highlight image portion and a magenta portion is a shadow portion when viewed from only a signal color, i.e., cyan. This is because setting an error diffusion coefficient on the basis of only the sum of cyan and magenta component values makes it impossible to selectively use error diffusion coefficients for the respective colors. As a consequence, dot arrangements of both colors have the same directional properties, resulting in an irritating image.

In this embodiment, therefore, error diffusion coefficients are variously changed so as to provide better dot dispersion properties by using various factors such as threshold forms without using the sum of cyan and magenta component values.

A description of portions common to the first embodiment will be omitted, and the characteristic processing in this embodiment will be mainly described below.

Figure 27:
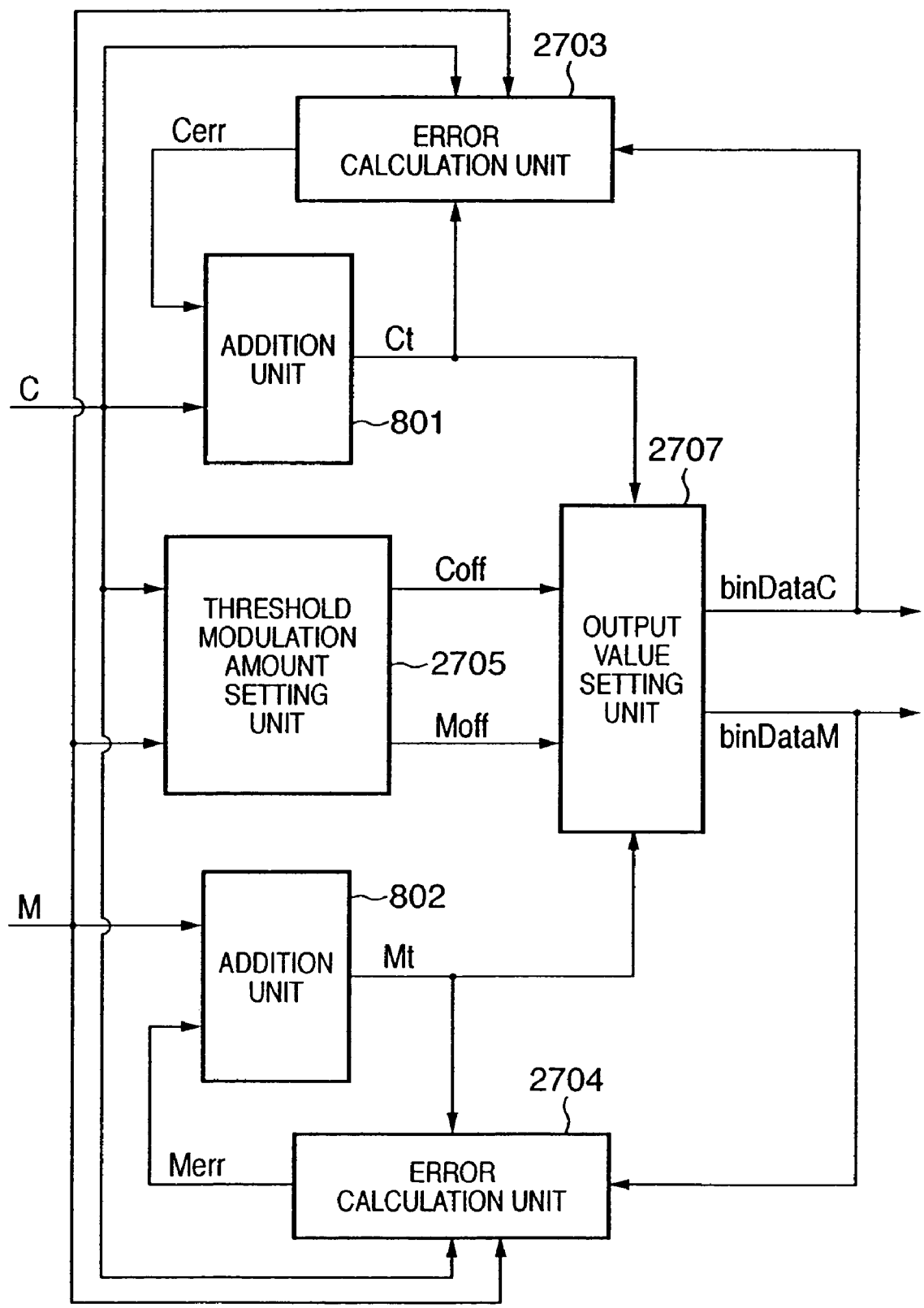
FIG. 27 is a block diagram showing the arrangement of an image processing apparatus according to the second embodiment.

FIG. 27 is a block diagram of a halftoning unit 34 in this embodiment. As described above, this arrangement can also be implemented by causing a computer to execute a program with a sequence reflecting differences from the processing in steps S2403 and S2406 in FIG. 24. FIGS. 24 and 22 differ in the following two points.

(1) A threshold modulation amount setting unit 2705 provides a threshold modulation amount on the basis of the sum of cyan and magenta density values as in Japanese Patent Laid-Open No. 2000-354172.

(2) Error calculation units 2703 and 2704 change error diffusion coefficients in accordance with cyan and magenta density values.

The operation of the threshold modulation amount setting unit 2705 is conventionally known, and hence a description thereof will be omitted. This embodiment is characterized in selection of error diffusion coefficients, and hence need not perform threshold modulation. In this case, a target pixel may be quantized by referring to the quantization thresholds or quantization table shown in FIG. 6 by using the input pixel values Ct and Mt as indexes for which errors are integrated.

Figure 28:
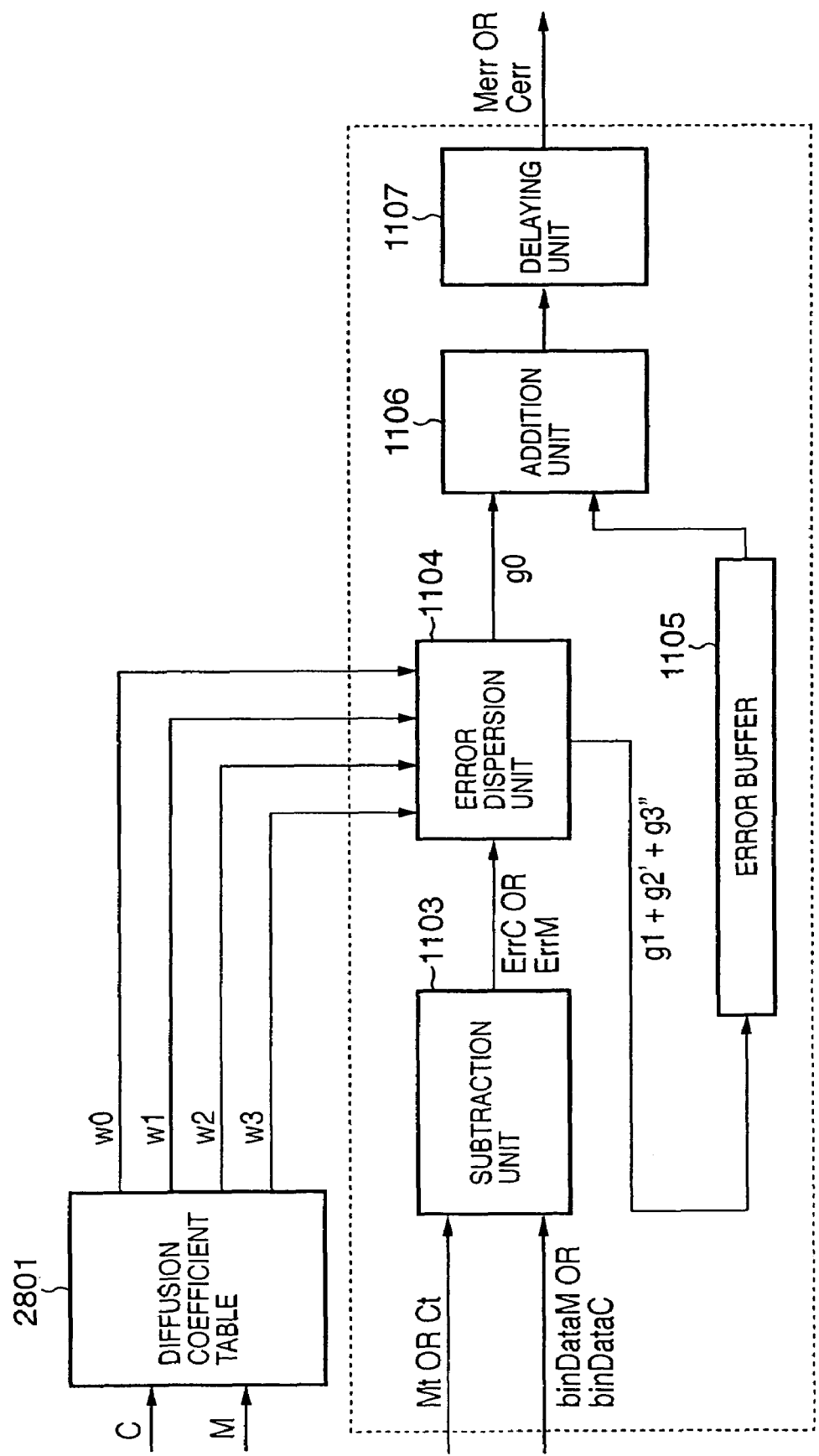
FIG. 28 is a block diagram showing the arrangement of an error calculation unit in the second embodiment.

The error calculation units 2703 and 2704 have an arrangement like the one shown in FIG. 28. The error calculation units 2703 and 2704 in FIG. 28 are common to cyan and magenta, and the arrangement for cyan will be described as a representative example.

First of all, a quantization value binDataC obtained from an output setting unit 807 is input to a subtraction unit 1103. The subtraction unit 1103 supplies, to an error dispersion unit 1104, an error ErrC obtained by subtracting the quantization value binDataC from the pixel value Ct after error diffusion.

An error diffusion coefficient table 2801 stores combinations of error diffusion coefficients (w0, w1, w2, w3) as shown in FIG. 20 in correspondence with cyan component values C and magenta component values M of a target pixel. The values shown in FIG. 20 are further divided into 1/16 to become weights (w0, w1, w2, w3). The error diffusion coefficient table 2801 outputs diffusion coefficients in accordance with the cyan component value C and magenta component value M and sends them to the error dispersion unit 1104.

Referring to FIG. 20, the gray level of each color component is quantized into 1/32 to reduce the capacity of the table. Referring to FIG. 20, in order to quantize each gray level into 1/32, the upper three bits of eight bits representing each color component value are used as an index. Note that in FIG. 20, the value obtained by adding 1-bit "0" to the end of upper three bits is expressed as an index. If, for example, cyan and magenta component values are 155 and 200, respectively, the cyan and magenta gray levels become 8 and 12, respectively, in FIG. 20. As a consequence, the selected diffusion coefficients become (6, 1, 3, 6). Each of these values is converted into a value with a denominator of 16 to become a weight. That is, the coefficients (w0, w1, w2, w3) are respectively converted into (6/16, 1/16, 3/16, 6/16).

FIG. 21 is a view showing the positional relationship between a target pixel 2101 and neighboring pixels to which an error ErrC is distributed. With regard to the quantization error of the target pixel, errors g0, g1, g2, and g3 are respectively distributed to a pixel which will become the next target pixel, a pixel on a line next to the target pixel, which is located two columns before the target pixel, a pixel on the line next to the target pixel, which is located one column before the target pixel, and a pixel located immediately below the target pixel. The error dispersion unit 1104 sequentially performs the following calculations:

$g3 = ErrC * w3$ $g2 = ErrC * w2$ $g1 = ErrC * w1$ $g0 = ErrC * w0$

Consider pixels to which errors are distributed and added. With regard to the target pixel, the errors g0, g1, g2, and g3 are respectively distributed from a pixel immediately before the target pixel, a pixel on a line immediately before the target pixel, which is located two columns after the target pixel, a pixel on the line immediately before the target pixel, which is located on a column next to the target pixel, and a pixel located immediately above the target pixel. Therefore, the error dispersion unit 1104 adds in advance g1 obtained from the target pixel, g2 (g2') obtained from the pixel immediately before the target pixel, and g3 (g3") obtained from the pixel two pixels before the target pixel, and stores the sum in an error buffer 1105 to make a delay of a line. With regard to g2' and g3", g2 and g3 may be temporarily stored in a register or the like such that the processing is delayed by one pixel with respect to g2, and by two pixels with respect to g3. This operation can be implemented by a latch as hardware which is synchronous with pixel clocks. The error buffer 1105 can be realized as a ring buffer having a length of a line. In addition, g0 is output without any change and input to an addition unit 1106.

The addition unit 1106 adds the error g0 and the value of g1+g2'+g3" obtained one line before and read out from the error buffer to calculate the error value Cerr to be added to the pixel next to the target pixel.

Note that the error buffer can be implemented by software in the following manner. Assume that the error buffer has a one-dimensional array represented by errBuf[0 . . . Last] held in the memory. In this case, an array index indicates the position of a pixel on a pixel column of one line. Assume that the position of the target pixel in the main scanning direction is represented by hPos. Note that errBufC[hPos] is read before error dispersion and added to the pixel value C to obtain the pixel value Ct after diffusion.

Errors can also be dispersed to neighboring pixels in the following manner:

errBufC[hPos]←g3 errBufC[hPos−1]←errBufC[hPos−1]+g2 errBufC[hPos−2]←errBufC[hPos−2]+g1 errBufC[hPos+1]←errBufC[hPos+1]+g0

Error diffusion coefficients are determined in the above manner. In addition, pixel quantization, error computation, diffusion processing, and the like are performed in the sequence shown in FIG. 24.

The error diffusion coefficient table shown in FIG. 20 is provided before quantization processing. A method of creating an error diffusion coefficient table will be described next.

<Creation of Error Diffusion Coefficient Table>

A sequence for creating the error diffusion coefficient table 2801 will be described with reference to the flow chart of FIG. 29. This sequence is executed in advance by a computer. Note that one combination of error diffusion coefficients is constituted by four coefficients w0 to w3 whose summation is 1, and hence a combination of these four coefficients will be referred to as a diffusion coefficient.

The image shown in FIG. 25 is used for the calculation of an evaluation value G (to be described later). FIG. 33 shows mathematical expressions representing all candidates for diffusion coefficients to be used for the creation of the error diffusion coefficient table 2801. One coefficient is selected from these diffusion coefficient candidates for each input gray level, and is then stored in the error diffusion coefficient table 2801. A diffusion coefficient setting sequence corresponding to cyan gray level c=0 and magenta gray level m=0 in FIG. 20 will be described below. Note that the gray level of each color component has been quantized into 3-bit data, as described with reference to FIG. 20. The sequence in FIG. 29 is therefore executed by using values before quantization which represent quantized values. Consider, for example, a method of using, as a value representing a given quantized value, the median between the maximum and minimum values of the original pixel value quantized into the quantized value. For this method, the value obtained by adding the binary number "10000b (b represents a binary number)" to the end of a gray level in FIG. 20 instead of 0 can be used as a representative value. For example, with regard to the gray level "0" in FIG. 20, 00010000b=16 obtained by replacing the final number "0" of 0000b can be used as a pixel value representing the quantized gray level "0". As the gray level increases by one, the representative values increases by 32. Referring to FIG. 29, therefore, with regard to cyan and magenta, gray levels are changed into eight values, i.e., 16, 48, 80, 112, 144, 176, 208, and 240 to determine error diffusion coefficients corresponding to the gray levels "0" to "14" in FIG. 20.

Figure 29:
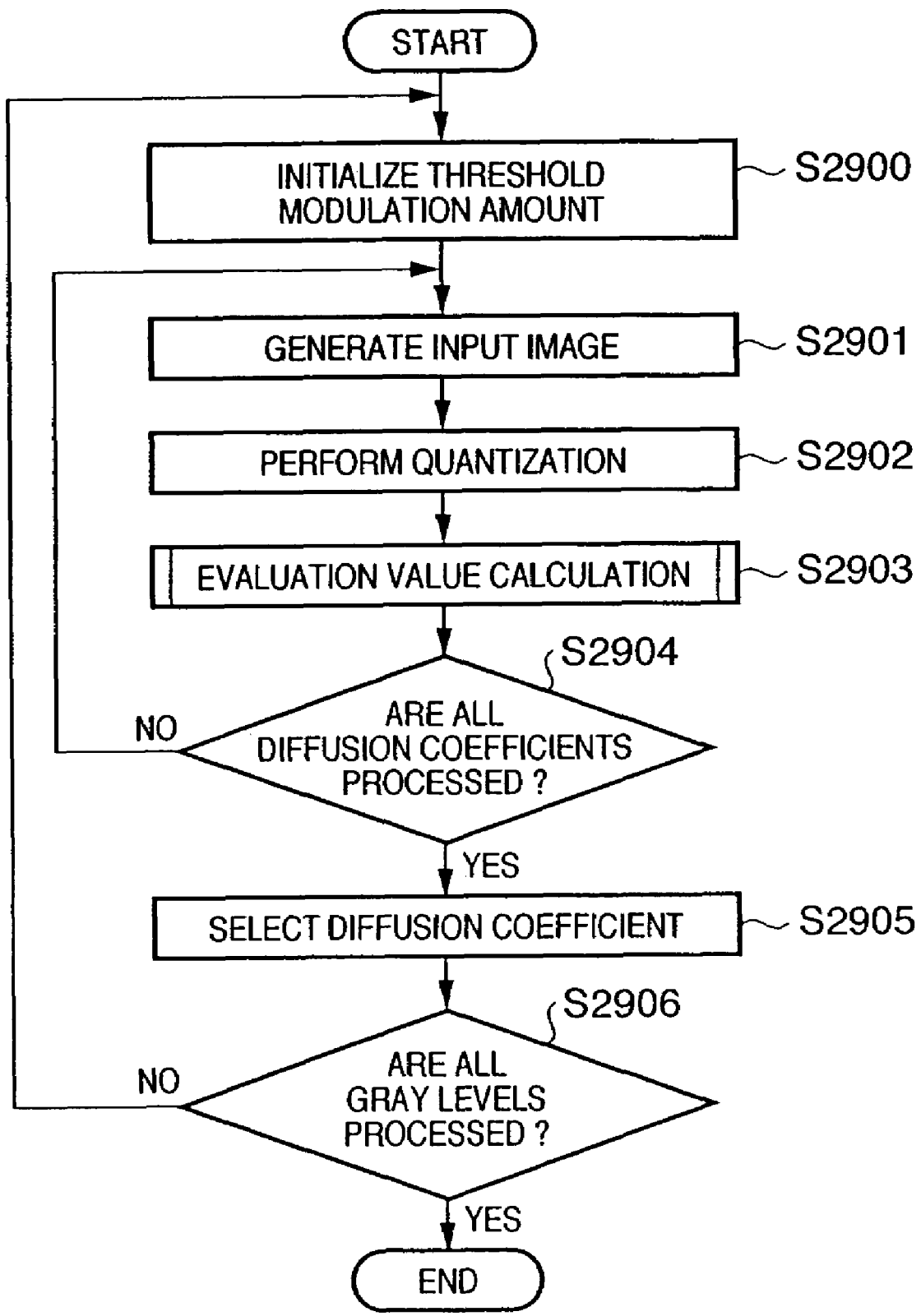
FIG. 29 is a flow chart for explaining a sequence for creating an error diffusion coefficient table.

Referring to FIG. 29, first of all, all the threshold modulation amounts are initialized to 0 (step S2900). Input image data is then generated, which has uniform gray levels c=16 and m=16 like the 512×512 pixels in FIG. 25 (step S2901). Quantization processing is performed for this input image data in the sequence shown in FIG. 24 (step S2902). At this time, any one of all the diffusion coefficient candidates shown in FIG. 33 is stored at a position in the error diffusion coefficient table 2801 which corresponds to input gray levels c=16 and m=16, i.e., the field corresponding to the cyan gray level "0" and the magenta gray level "0" in FIG. 20.

With regard to the generated binary image, the evaluation value G in the image area 251 of 256×256 pixels located near the lower end of the image shown in FIG. 25 in which the formation of dots is expected to have reached a stable state is calculated by a method to be described later (step S2903). The evaluation value G is a value serving as an index for evaluating the visual uniformity of an image. As the evaluation value G decreases, the image to be evaluated is regarded as an image having a visually uniform gray level distribution. That is, as the evaluation value G decreases, the binary image to be evaluated is similar to the original uniform image, and hence it can be determined that desirable binarization processing has been done.

Finally, it is checked whether or not evaluation values have been computed for all the diffusion coefficient candidates (step S2904). If computation is not completed, the processing from step S2901 to step S2903 is repeated. If evaluation values for all the diffusion coefficient candidates have been computed, a diffusion coefficient which provides the optimal evaluation value of the evaluation calculation results of all the diffusion coefficients is stored at a position in the error diffusion coefficient table 2801 which corresponds to c=16 and m=16 (step S2905). Note that since a binary image most similar to the original image is the most desirable binary processing result, the optimal evaluation value is synonymous with the minimum evaluation value.

The above processing is executed in the sequence shown in FIG. 29 while the cyan gray level is changed the eight different levels from 16 to 240, and the cyan gray level is changed to the eight different levels from 16 to 240 for each of these levels (step S2906), thereby completing the error diffusion coefficient table 2801.

For image data in which pixels with constant gray levels c and m are uniformly distributed, binarization processing using all combinations of diffusion coefficient candidates is performed by using only reference thresholds, thereby determining a diffusion coefficient by which an optimal pseudo gray scale image, i.e., a pseudo gray scale image that is visually most similar to the original image, can be obtained, on the basis of the evaluation value G. This coefficient is set as a diffusion coefficient corresponding to the gray levels c and m, and diffusion coefficients are obtained for the respective gray levels in the same manner, thereby creating the error diffusion coefficient table 2801.

(Calculation of Evaluation Value G)

Figure 30:
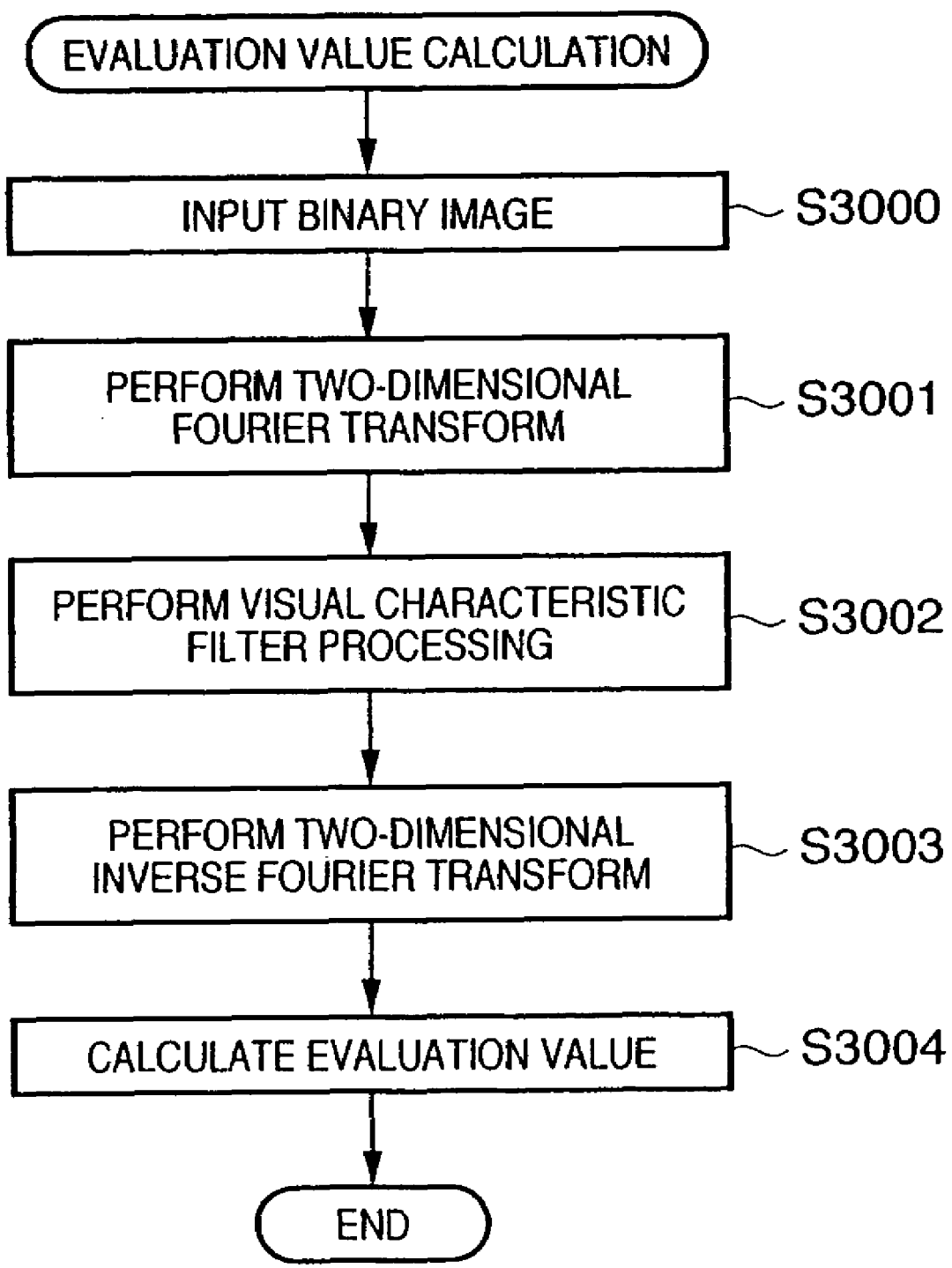
FIG. 30 is a flow chart for explaining evaluation value computation processing for an image.
Figure 31:
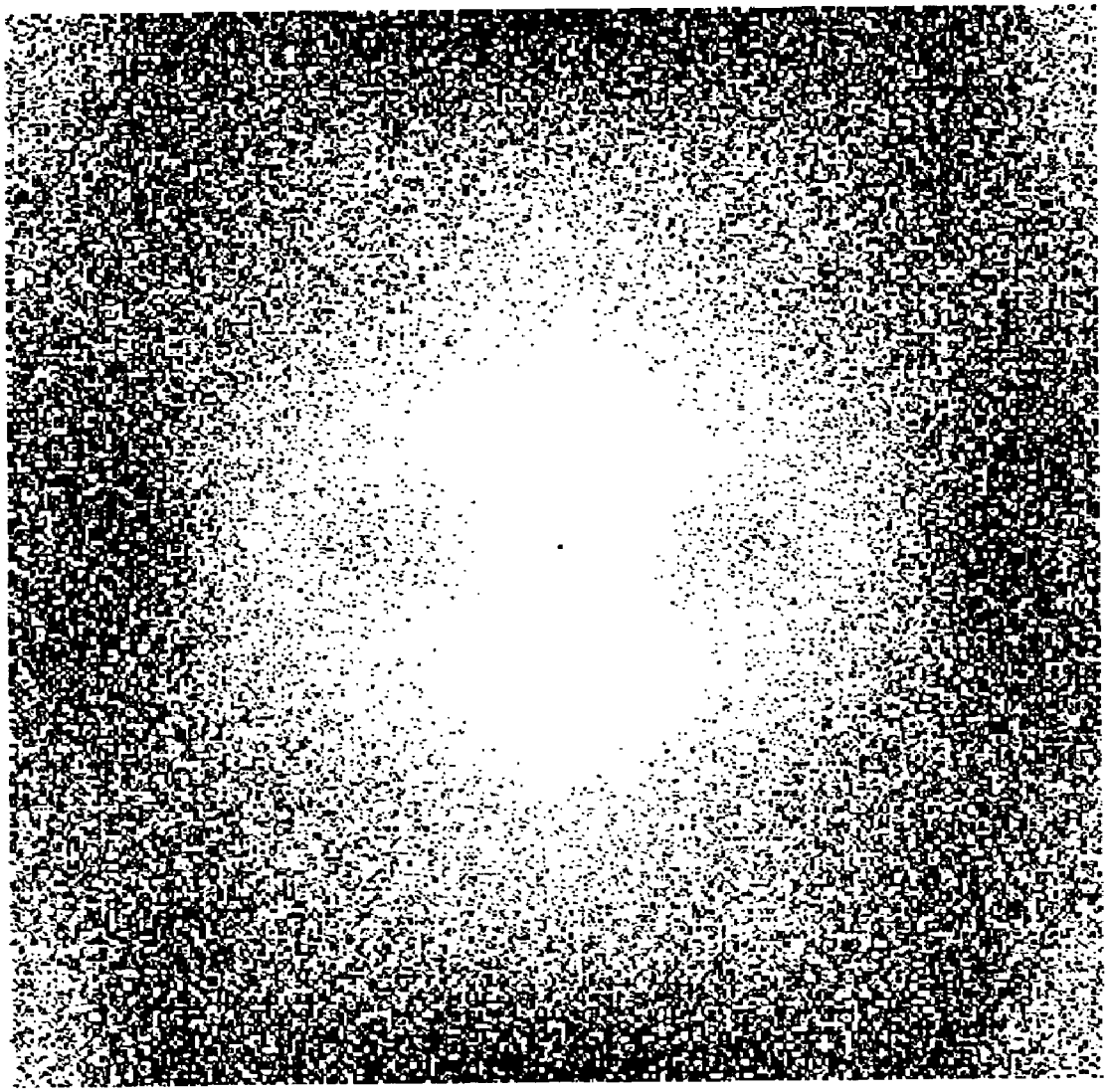
FIG. 31 is a view showing an example of a two-dimensional power spectrum.
Figure 32:
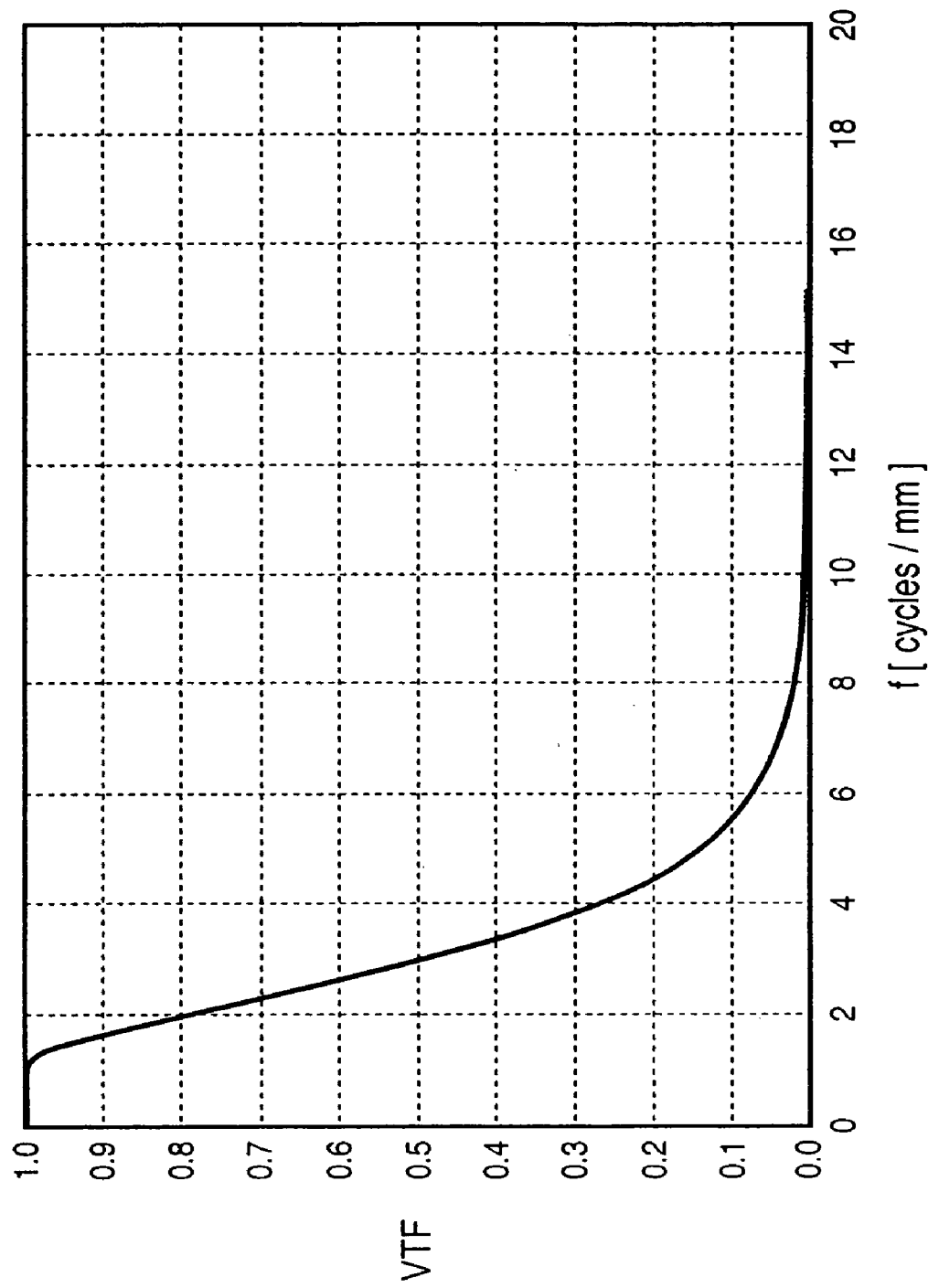
FIG. 32 is a graph showing an example of a visual characteristic filter.

A method of calculating the above evaluation value G will be described next with reference to the flow chart of FIG. 30. First of all, the binary image 251 (see FIG. 25) of 256×256 pixels which is to be evaluated is input (step S3000). A two-dimensional Fourier transform is performed for the input binary image to obtain a two-dimensional power spectrum P(u, v) (step S3001). Parameters u and v represent spatial frequency values on a two-dimensional power spectrum which fall within the range of −128 to 128. FIG. 31 shows an example of a two-dimensional power spectrum. The center of the image corresponds to a direct current (DC) component. The intensity of the power is expressed by the density of the image. A bright portion indicates that the corresponding frequency component is strong, whereas a dark portion indicates that the corresponding frequency component is weak. Filtering is performed for the above two-dimensional power spectrum of the input binary image by using a visual characteristic filter (VTF) (step S3002). A visual characteristic filter VTF (f) used in this embodiment is defined by $$VTF(f) = \begin{cases} 5.05 \exp(-0.133f)(1 - \exp(-0.096f)) & f \geq 5 \\ 1 & f < 5 \end{cases}$$

where f is a spatial frequency, which is given as a cycle per field angle (cycles/degree). FIG. 32 shows the relationship between VTF(f) and a spatial frequency f (cycles/mm) obtained by converting a cycle per field angle into a cycle per mm with the observation distance being set to 300 mm. A visual characteristic is a characteristic that indicates the degree of visual recognition when man observes an image. Referring to FIG. 32, man can almost completely recognize an image up to the spatial frequency f of about 1 cycle/mm, but the degree of visual recognition rapidly decreases when the spatial frequency f exceeds 1 cycle/mm. When the spatial frequency f becomes about 10 cycles/mm, man can hardly recognize the image.

Filtering is performed for the two-dimensional power spectrum P(u, v) by using the visual characteristic filter VTF(f) provided in this manner to obtain P'(u, v) expressed by $$P'(u,v) = VTF(f) * P(u,v)$$

where P'(u, v) is the spatial frequency distribution obtained by filtering the original spatial frequency distribution of the image with a visual characteristic, i.e., the spatial frequency distribution obtained by weighting the original spatial frequency distribution with the degrees of recognition corresponding the spatial frequencies based on the observer.

A two-dimensional inverse Fourier transform is then performed for P'(u, v) having undergone the visual characteristic filtering to obtain p'(x, y) (step S3003). In this case, x and y represent the pixel position in the image which is obtained by the inverse Fourier transform and falls within the range of 0 to 255. Finally, the standard deviation of the pixel value at p'(x, y) is set as the evaluation value G of the output image (step S3004), thus terminating the evaluation value computation processing for the input image.

$$G\left\{\frac{1}{256^2}\sum_{x,y=0}^{256}\left(p'(x,y)-\overline{p'}\right)^2\right\}^{1/2}$$

$$\overline{p'} = \frac{1}{256^2}\sum_{x,y=0}^{256} p'(x,y)$$

The evaluation value G is provided in the above sequence. That is, an image P' is generated by weighting the spatial frequency components of the image P as an evaluation target in accordance with the human visual characteristic, and the standard deviation of each pixel value of the image P' is obtained as the evaluation value G. When given image data is to be evaluated, therefore, image data that can be visually recognized by man is evaluated instead of the image data itself. The evaluation value G is then obtained from the image data subjected to filtering with the visual characteristic. For this reason, if image data to be evaluated is image data visually recognized by an observer as image data having a uniform density (luminance) distribution, the evaluation value G becomes 0. The use of this evaluation value G as an evaluation criterion for the above diffusion coefficients makes it possible to select a diffusion coefficient, for each gray level, which provides a visually optimal result.

In this embodiment, an optimal error diffusion coefficient is provided for each combination of cyan and magenta component values in the above manner.

This makes it possible to properly cope with changes in factors such as various kinds of threshold forms. In addition, in order to quickly extract desired information by only making reference using cyan and magenta component values, error diffusion coefficients can be set or used as coefficients in a two-dimensional array based on cyan and magenta component values or an array having, as offsets, computation outputs obtained by performing a predetermined computation for combinations of two colors, i.e., combination colors.

In addition, an error diffusion coefficient can be quickly extracted by referring to the table using only cyan and magenta component values.

As indexes for reference to an error diffusion coefficient, not only the value of a target pixel itself but also the sum, average, maximum value, minimum value, or product (inner or outer product) of the color components of the target pixel and neighboring pixels (target pixel group) can be used.

When the sum of the respective color components of a target pixel group is used, each feature amount of cyan and magenta in a local area can be quickly obtained.

When the average of the respective color components of the target pixel group is used, each feature amount of cyan and magenta in the local area can be expressed in a small data size, and feature amounts can be extracted with higher robustness against the influences of locally added noise. For this reason, an error diffusion coefficient can be determined in accordance with the characteristics of the local area, and a high-quality binary image in which the dot dispersion properties have been improved can be obtained.

There is also available a method of obtaining an error diffusion coefficient with reference to the maximum value of the respective color components in a target pixel group. In this case, a dominant component of each color component can be extracted and used. That is, dot dispersion properties can be preferentially improved for the dominant component.

In contrast, there is available a method of using a threshold modulation amount corresponding to the minimum value of each color component in a target pixel group. In this case, a weak component of the respective color components, cyan and magenta components in this case, can be extracted. With this operation, in an area where one color component is a shadow, and the other color component is a highlight, dot dispersion properties can be preferentially improved for the highlight color component.

A method using the product of the respective color component values of a target pixel group pays attention to the fact that the characteristics of error diffusion coefficients that provide a better dot arrangement greatly vary between an area where the product of cyan and magenta component values is small and an area where the product is large, as shown in FIG. 20. That is, the table size can be reduced by setting error diffusion coefficients in accordance with the magnitude of the product of cyan and magenta component values.

Figure 11:
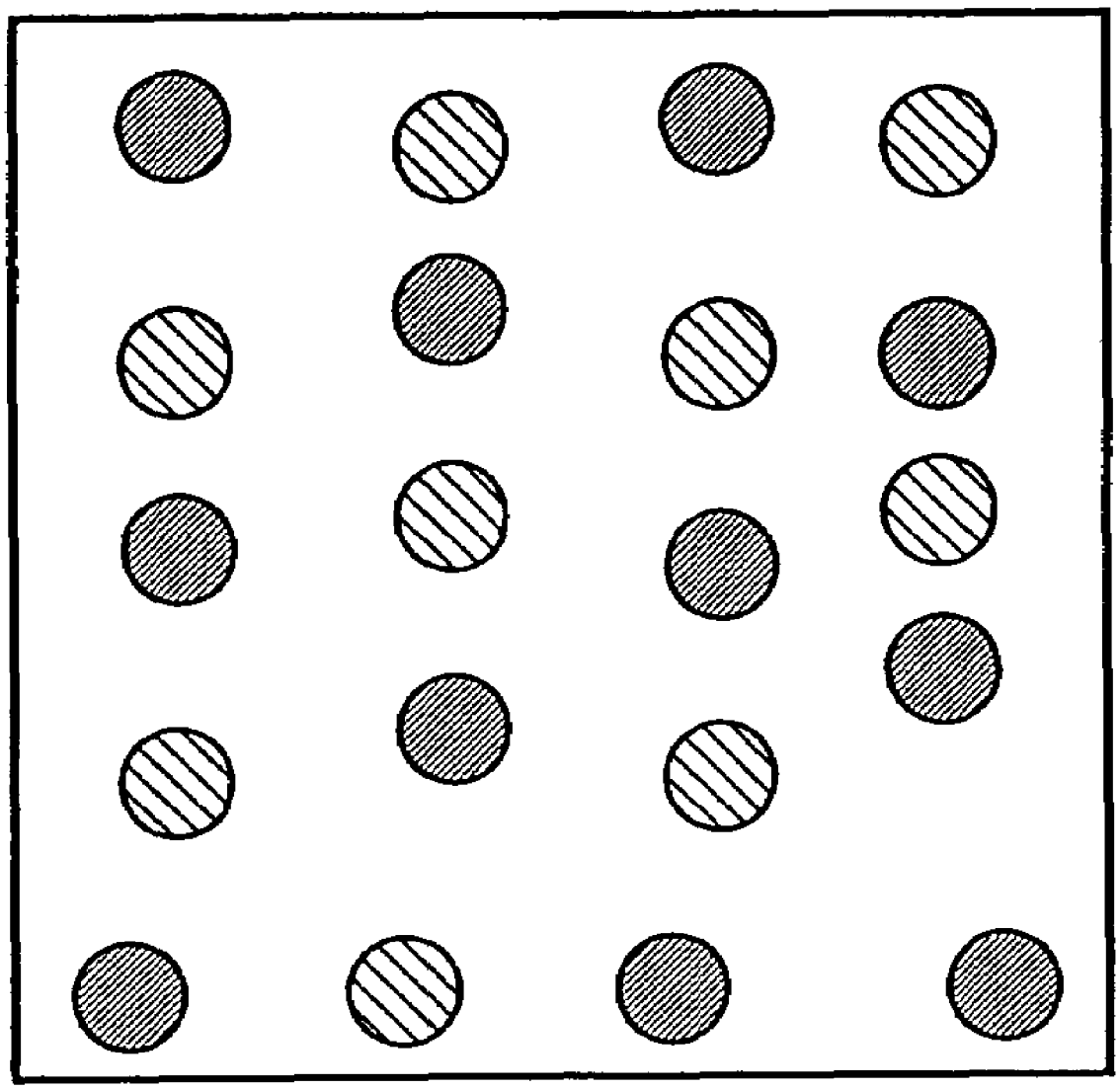
FIG. 11 is a view showing an example of good dot dispersion properties in two-color print operation.

As described above, according to this embodiment, an optical diffusion coefficient can be selected in accordance with a combination of cyan and magenta gray levels, and a good dot arrangement pattern like the one shown in FIG. 11 can be obtained.

Third Embodiment

This embodiment is a combination of the two-color simultaneous error diffusion technique for false edge improvement described in the first embodiment and the two-color simultaneous error diffusion technique for dot dispersion property improvement described in the second embodiment. Quantization is performed in the following sequence.

1. A threshold (Cthrehold) to be used for error diffusion for a C component is obtained on the basis of a density value M of an M component.

2. A threshold modulation amount table like the one shown in FIG. 12 is referred to by using a combination of a density value C of the C component and a density value M of the M component.

3. A correction threshold modulation amount Cthreshold' is determined by adding the threshold modulation amount obtained in the second step to a threshold Cthreshold to be used for error diffusion for the C component.

4. A density Ct of the C component is compared with the correction threshold Cthreshold'. If the density Ct is higher, output operation is performed with C ink.

5. A threshold (Mthreshold) to be used for error diffusion for the M component is obtained on the basis of the density value C of the C component.

6. A threshold modulation amount table like the one shown in FIG. 14 is referred to by using a combination of the density value M of the M component and the density value C of the C component.

7. A correction threshold modulation amount Mthreshold' is determined by adding the threshold modulation amount obtained in the sixth step to a threshold Mthreshold to be used for error diffusion for the M component.

8. A density Mt of the M component is compared with the correction threshold Mthreshold'. If the density Mt is higher, output operation is performed with M ink.

9. An error diffusion coefficient table like the one shown in FIG. 20 is referred to on the basis of a combination of the C and M components.

10. A quantization error is diffused to neighboring pixels, which have not been quantized, by using the error diffusion coefficient obtained in the ninth step.

Figure 34:
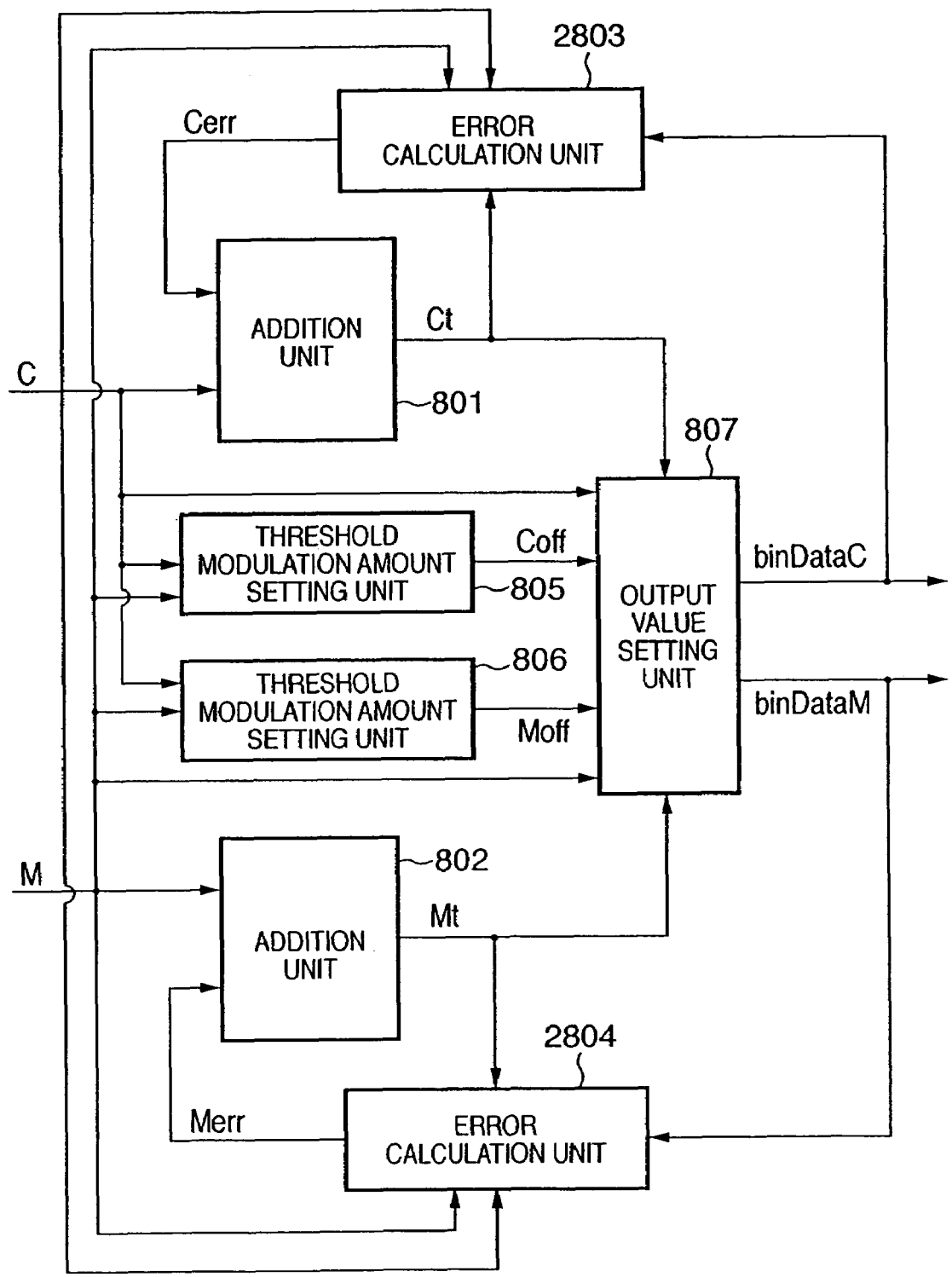
FIG. 34 is a block diagram showing the arrangement of an image processing apparatus according to the third embodiment.

In this embodiment, the error calculation units 803 and 804 shown in FIG. 23 in the arrangement of the first embodiment are replaced with error calculation units 2703 and 2704 shown in FIG. 28, and error diffusion processing is performed by selecting an error diffusion coefficient in accordance with the cyan and magenta values of a target pixel using the error diffusion coefficient table set in the manner as in the second embodiment. FIG. 34 shows the arrangement of this embodiment.

As in the first embodiment, the above false edge improvement and dot dispersion property improvement can be realized by using density modulation.

1. A threshold (Cthrehold) to be used for error diffusion for the C component is obtained on the basis of the density value M of an M component.

2. A density value modulation amount table like the one shown in FIG. 16 is referred to by using a combination of the density value C of the C component and the density value M of the M component.

3. A correction density Ct' for the C component is determined by adding the density value modulation amount obtained in the second step to the density Ct of the C component.

4. The correction density Ct' for the C component is compared with the threshold Cthreshold. If the correction density value Ct' is larger, output operation is performed with C ink.

5. A threshold (Mthreshold) to be used for error diffusion for the M component is obtained on the basis of the density value C of the C component.

6. A density value modulation amount table like the one shown in FIG. 18 is referred to by using a combination of the density value M of the M component and the density value C of the C component.

7. A correction density Mt' is determined by adding the density value modulation amount obtained in the sixth step to a density Mt of the M component.

8. The correction density Mt' for the M component is compared with the threshold Mthreshold. If the correction density Mt' is higher, output operation is performed with M ink.

9. An error diffusion coefficient table like the one shown in FIG. 20 is referred to on the basis of a combination of the C and M components.

10. A quantization error is diffused to neighboring pixels, which have not been quantized, by using the error diffusion coefficient obtained in the ninth step.

This embodiment can simultaneously realize the effects of the first and second embodiments. That is, an excellent dot arrangement can be obtained, which exhibits good dot dispersion properties among a plurality of colors and for which false edge improvement has been made.

Fourth Embodiment

The first, second, and third embodiments are characterized in that various kinds of parameter files used when the error diffusion method is performed for cyan and magenta components are held as a two-dimensional array constituted by combinations of cyan and magenta component values or an array having, as offsets, computation outputs obtained by performing a predetermined computation for combinations of two colors, i.e., combination colors. In contrast to this, a preferred embodiment will be described below, in which error diffusion for cyan and magenta is executed by one of the first to third embodiments, whereas error diffusion for yellow and each of other colors is performed.

First of all, processing for cyan and magenta is performed in the same manner as in the first to third embodiments. In contrast to this, a threshold modulation amount table, density value modulation amount table, and error diffusion coefficient table are set and used for measures against false edge and dot dispersion properties in the error diffusion method for yellow and the other colors as in the case of cyan and magenta. As such tables, some of the tables for cyan and magenta are used. For example, in such a table, the value of a cyan component is read as the value of an yellow component, and a portion where the value of a magenta component is 0 is used for yellow or another color. When error diffusion is to be performed for each color, e.g., yellow or another color, this error diffusion method can be regarded to be equivalent to a case wherein the input density value of one color in the error diffusion method for cyan and magenta is 0.

In the case wherein error diffusion is to be performed for each color as well, an error diffusion method which can improve false edge and dot dispersion properties can be realized by assuming that the other input density value is 0 in the error diffusion method for cyan and magenta.

In this manner, the table size can be reduced by using some of various tables prepared for the error diffusion method of obtaining a good visual characteristic with respect to overlaps of two or more colors instead of setting/holding/ using a threshold modulation table, density value modulation table, and error diffusion coefficient table for each plane subjected to error diffusion for each color.

In the first to fourth embodiments, two color inks, i.e., cyan and magenta inks, are used, the dye concentration is changed in two steps, i.e., high and low, and the discharge amount is changed in two steps, i.e., large and small. Obviously, however, the effects of the present invention are not limited to those described above, and similar effects can be obtained by applying the present invention to a larger number of colors, a larger number of quantization gray levels, a larger number of dye concentration gray levels, and a larger number of discharge amount gray levels.

<Example of Arrangement of Printing Apparatus>

In each of the above embodiments, droplets discharged from the printhead are ink droplets, and the liquid stored in the ink tank is ink. However, the content of the tank is not limited to ink. For example, a process solution or the like may be stored in the ink tank, which is discharged to a printing medium to improve the fixing property or water resistance of a printed image or improve the image quality.

The above embodiments use the system, among various ink-jet recording systems, which has a means (e.g., an electrothermal converter or laser light) for generating heat energy as energy used to discharge ink, and changes the state of ink by using the heat energy. With this system, high-density, high-resolution print operation can be realized.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through an orifice by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiments which can be electrically connected to the apparatus main unit and can receive ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printhead, capping means, cleaning means, pressurization or suction means, and preheating means using electrothermal transducers, another heating element, or a combination thereof. It is also effective for stable printing to provide a predischarge mode which performs discharge independently of printing.

In addition to the print mode of printing images only in a main color such as black, the printer may have at least one of the print mode of printing images in different colors and the print mode of printing images in full-color as a mixture of colors, which mode may be realized by an integral printhead or a combination of a plurality of printheads.

In each of the above embodiments, it is assumed that the ink is a liquid. Alternatively, the present invention may employ an ink which is solid at room temperature or less and softens or liquefies at room temperature or an ink which liquefies upon application of a use printing signal, since it is a general practice to perform temperature control of the ink itself within a range from 30° C. to 70° C. in the in-jet system, so that the ink viscosity can fall within a stable discharge range.

In addition, in order to prevent a temperature rise caused by hat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers which being heated in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the printing apparatus of the present invention may be used in the form of a copying machine combined with a reader, and the like, or a facsimile apparatus having a transmission/reception function in addition to a printer integrally or separately mounted as an image output terminal of information processing equipment such as a computer.

The present invention can be applied to a system constituted by a plurality of devices (e.g., host computer, interface, reader, printer) or to an apparatus comprising a signal device (e.g., copying machine, facsimile machine).

The object of the present invention is realized even by supplying a storage medium (or recording medium) storing software program codes for realizing the functions of the above embodiments to a system or apparatus, and causing the computer (or a CPU or an MPU) of the system or apparatus to read out and execute the program codes stored in the storage medium. In this case, the program codes read out from the storage medium realize the functions of the above embodiments by themselves, and the storage medium storing the program codes constitutes the present invention. The functions of the above embodiments are realized not only when the readout program codes are executed by the computer but also when the OS (Operating System) running on the computer performs part or all of actual processing on the basis of the instructions of the program codes.

The functions of the above embodiments are also realized when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As has been described above, according to the present invention, false edge improvement and dot dispersion property improvement can be realized in the error diffusion method among a plurality of colors regardless of manner of setting thresholds.

In addition, various desired modulation amounts can be obtained by making references, multilevel image data can be quantized at high speed.

Furthermore, when the error diffusion method to be used among a plurality of colors and the error diffusion method for a single color are to be switched for each color plane, the table size can be reduced by using, for the error diffusion method for a single color, various kinds of tables, e.g., a threshold modulation amount table, density value modulation amount table, and error diffusion coefficient table, prepared for the error diffusion method to be used among a plurality of colors.

Moreover, using predetermined computation outputs for the respective colors when referring to various kinds of tables makes it possible to realize high-speed reference, reference robust against noise, reference in consideration of the balance among the density values of a plurality of colors, reductions in the sizes of the tables, and the like.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for quantizing multilevel color image data containing at least two kinds of color components, comprising:
    error addition means for adding a quantization error value distributed from a neighboring pixel for each color component to each of a plurality of color components contained in a target pixel;
    a threshold table which stores a quantization threshold for each of the color components in accordance with a combination of color component values of pixels;
    modulation amount determination means for determining a threshold modulation amount of each color in accordance with a combination of color component values of pixels including the target pixel; and
    quantization means for acquiring a threshold for each color component from said threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added by said error addition means.

2. The apparatus according to claim 1, wherein said modulation amount determination means determines a threshold modulation amount for each color in accordance with a combination of color component values of the target pixel.

3. The apparatus according to claim 1, wherein said modulation amount determination means determines a threshold modulation amount for each color in accordance with a combination of average values, maximum values, or minimum values of color components of the target pixel and a neighboring pixel thereof.

4. An image processing apparatus for quantizing multilevel color image data containing at least two kinds of color components, comprising:
    error addition means for adding a quantization error value distributed from a neighboring pixel for each color component to each of a plurality of color components contained in a target pixel;
    quantization means for quantizing each color component of the target pixel; and
    a diffusion coefficient table which stores a diffusion coefficient for diffusing a quantization error produced by said quantization means, in accordance with a combination of color component values of a pixel,
    wherein said error addition means adds an error value to the target pixel in accordance with a combination of color components of the target pixel and a diffusion coefficient selected from said diffusion coefficient table.

5. The apparatus according to claim 4, wherein said error addition means selects a diffusion coefficient from said diffusion coefficient table in accordance with a combination of color component values of the target pixel.

6. The apparatus according to claim 4, wherein said error addition means selects a diffusion coefficient from said diffusion coefficient table in accordance with a combination of average values, maximum values, or minimum values of color components of the target pixel and a neighboring pixel thereof.

7. The apparatus according to claim 4, wherein said error addition means selects a diffusion coefficient from said diffusion coefficient table in accordance with a product of color component values of the target pixel and a neighboring pixel thereof.

8. An image processing apparatus for quantizing multilevel color image data containing at least two kinds of color components, comprising:
    error addition means for adding a quantization error value distributed from a neighboring pixel for each color component to each of a plurality of color components contained in a target pixel;
    a threshold table which stores a quantization threshold for each of the color components in accordance with a combination of color component values of pixels;
    modulation amount determination means for determining a threshold modulation amount of each color in accordance with a combination of color component values of pixels including the target pixel;
    quantization means for acquiring a threshold for each color component from said threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added by said error addition means; and
    a diffusion coefficient table which stores a diffusion coefficient for diffusing a quantization error produced by said quantization means, in accordance with a combination of color component values of a pixel,
    wherein said error addition means adds an error value to the target pixel in accordance with a combination of color components of the target pixel and a diffusion coefficient selected from said diffusion coefficient table.

9. An image processing apparatus for quantizing multilevel color image data containing at least three kinds of color components, comprising:

error addition means for adding a quantization error value distributed from a neighboring pixel for each color component to each of a plurality of color components contained in a target pixel;

a threshold table which stores a quantization threshold for each of the color components in accordance with a combination of color component values of pixels;

modulation amount determination means for determining a threshold modulation amount of each color in accordance with a combination of color component values of pixels including the target pixel; and quantization means for acquiring a threshold for each color component from said threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added by said error addition means, wherein a combination of two kinds of color components is quantized by said image processing apparatus and a remaining color component is quantized with a value of a color component other than a target color component being regarded as 0.

10. An image processing method of quantizing multilevel color image data containing at least two kinds of color components, comprising:

an error addition step of adding a quantization error value distributed from a neighboring pixel for each color component to each of a plurality of color components contained in a target pixel;

a modulation amount determination step of determining a threshold modulation amount of each color in accordance with a combination of color component values of pixels including the target pixel; and a quantization step of acquiring a threshold for each color component, in accordance with a combination of color components of the target pixel, from a threshold table which stores a quantization threshold for each of the color components in accordance with a combination of color component values of pixels, determining a threshold modulated by adding the modulation amount to the threshold for each color, and quantizing the target pixel in accordance with a relationship in magnitude between the modulated threshold and a value of each color component to which an error value is added in the error addition step.

11. The method according to claim 10, wherein in the modulation amount determination step, a threshold modulation amount for each color is determined in accordance with a combination of color component values of the target pixel.

12. The method according to claim 10, wherein in the modulation amount determination step, a threshold modulation amount for each color is determined in accordance with a combination of average values, maximum values, or minimum values of color components of the target pixel and a neighboring pixel thereof.

13. An image processing method of quantizing multilevel color image data containing at least two kinds of color components, comprising:

an error addition step of adding a quantization error value distributed from a neighboring pixel for each color component to each of a plurality of color components contained in a target pixel; and a quantization step of quantizing each color component of the target pixel wherein in the error addition step, an error value is added to the target pixel in accordance with a combination of color components of the target pixel and a diffusion coefficient selected from a diffusion coefficient table which stores a diffusion coefficient for diffusing a quantization error produced in the quantization step, in accordance with a combination of color component values of a pixel.

14. The method according to claim 13, wherein in the error addition step, a diffusion coefficient is selected from the diffusion coefficient table in accordance with a combination of color component values of the target pixel.

15. The method according to claim 13, wherein in the error addition step, a diffusion coefficient is selected from the diffusion coefficient table in accordance with a combination of average values, maximum values, or minimum values of color components of the target pixel and a neighboring pixel thereof.

16. The method according to claim 13, wherein in the error addition step, a diffusion coefficient is selected from the diffusion coefficient table in accordance with a product of color component values of the target pixel and a neighboring pixel thereof.

17. An image processing method of quantizing multilevel color image data containing at least two kinds of color components, comprising:

an error addition step of adding a quantization error value distributed from a neighboring pixel for each color component to each of a plurality of color components contained in a target pixel;

a modulation amount determination step of determining a threshold modulation amount of each color in accordance with a combination of color component values of pixels including the target pixel; and a quantization step of acquiring a threshold for each color component, in accordance with a combination of color components of the target pixel, from a threshold table which stores a quantization threshold for each of the color components, in accordance with a combination of color component values of pixels, determining a threshold modulated by adding the modulation amount to the threshold for each color, and quantizing the target pixel in accordance with a relationship in magnitude between the modulated threshold and a value of each color component to which an error value is added in the error addition step, wherein in the error addition step, an error value is added to the target pixel in accordance with a combination of color components of the target pixel and a diffusion coefficient selected from a diffusion coefficient table which stores a diffusion coefficient for diffusing a quantization error produced in the quantization step in accordance with a combination of color component values of a pixel.

18. An image processing method of quantizing multilevel color image data containing at least three kinds of color components, comprising:

an error addition step of adding a quantization error value distributed from a neighboring pixel for each color component to each of a plurality of color components contained in a target pixel;

a modulation amount determination step of determining a threshold modulation amount of each color in accordance with a combination of color component values of pixels including the target pixel; and a quantization step of acquiring a threshold for each color component, in accordance with a combination of color components of the target pixel, from a threshold table which stores a quantization threshold for each of the color components in accordance with a combination of color component values of pixels, determining a threshold modulated by adding the modulation amount to the threshold for each color, and quantizing the target pixel in accordance with a relationship in magnitude between the modulated threshold and a value of each color component to which an error value is added in the error addition step, wherein a combination of two kinds of color components is quantized by said image processing method, and a remaining color component is quantized with a value of a color component other than a target color component being regarded as 0.

19. A computer-readable medium encoding a program for causing a computer to quantize multilevel color image data containing at least two kinds of color components, said program comprising:

a code for an error addition step of adding a quantization error value distributed from a neighboring pixel for each color component to each of a plurality of color components contained in a target pixel;

a code for a modulation amount determination step of determining a threshold modulation amount of each color in accordance with a combination of color component values of pixels including the target pixel; and a code for a quantization step of acquiring a threshold for each color component from a threshold table in accordance with a combination of color components of the target pixel, determining a threshold modulated by adding the modulation amount to the threshold for each color, and quantizing the target pixel in accordance with a relationship in magnitude between the modulated threshold and a value of each color component to which an error value is added in the error addition step.

20. The medium according to claim 19, wherein in the modulation amount determination step, a threshold modulation amount for each color is determined in accordance with a combination of color component values of the target pixel.

21. The medium according to claim 19, wherein in the modulation amount determination step, a threshold modulation amount for each color is determined in accordance with a combination of average values, maximum values, or minimum values of color components of the target pixel and a neighboring pixel thereof.

22. A computer-readable medium encoding a program for causing a computer to quantize multilevel color image data containing at least two kinds of color components, said program comprising:

a code for an error addition step of adding a quantization error value distributed from a neighboring pixel for each color component to each of a plurality of color components contained in a target pixel;

a code for a quantization step of quantizing each color component of the target pixel; and a diffusion coefficient table, wherein in the code for the error addition step, a diffusion coefficient is selected, in accordance with a combination of color components of the target pixel, from a diffusion coefficient table which stores a diffusion coefficient for diffusing the quantization error in accordance with a combination of color component values of a pixel, and an error value is added to the target pixel in accordance with the selected diffusion coefficient.

23. The medium according to claim 22, wherein in the error addition step, a diffusion coefficient is selected from the diffusion coefficient table in accordance with a combination of color component values of the target pixel.

24. The medium according to claim 22, wherein in the error addition step, a diffusion coefficient is selected from the diffusion coefficient table in accordance with a combination of average values, maximum values, or minimum values of color components of the target pixel and a neighboring pixel thereof.

25. The medium according to claim 22, wherein in the error addition step, a diffusion coefficient is selected from the diffusion coefficient table in accordance with a product of color component values of the target pixel and a neighboring pixel thereof.

26. A computer-readable medium encoding a computer program for causing a computer to quantize multilevel color image data containing at least two kinds of color components, said program comprising:

a code for an error addition step of adding a quantization error value distributed from a neighboring pixel for each color component to each of a plurality of color components contained in a target pixel;

a code for a modulation amount determination step of determining a threshold modulation amount of each color in accordance with a combination of color component values of pixels including the target pixel; and a code for a quantization step of acquiring a threshold for each color component, in accordance with a combination of color components of the target pixel, from a threshold table which stores a quantization threshold for each of the color components in accordance with a combination of color component values of pixels, determining a threshold modulated by adding the modulation amount to the threshold for each color, and quantizing the target pixel in accordance with a relationship in magnitude between the modulated threshold and a value of each color component to which an error value is added in the error addition step, wherein in the code for the error addition step, a diffusion coefficient is selected, in accordance with a combination of color components of the target pixel, from a diffusion coefficient table which stores a diffusion coefficient for diffusing a quantization error in accordance with a combination of color component values of a pixel, and an error value is added to the target pixel in accordance with the selected diffusion coefficient.

* * * * *

UNITED STATES PATENT AND TRADEMARK OFFICE
CERTIFICATE OF CORRECTION

PATENT NO. : 7,342,684 B2
APPLICATION NO. : 10/664948
DATED : March 11, 2008
INVENTOR(S) : Kazuya Imafuku et al.

It is certified that error appears in the above-identified patent and that said Letters Patent is hereby corrected as shown below:

COLUMN 1:

Line 38, "v1-v1+ExW1" should read --v1 = v1 + E x W1--.

COLUMN 4:

Line 20, "comprises" should read --comprises:--; and
Line 53, "comprises" should read --comprises:--.

COLUMN 8:

Line 45, "a" should read --an--; and
Line 50, "ink cartridge" should read --ink-jet printer--.

COLUMN 13:

Line 5, "errBufC☐hPos☐←g3" should read --errBufC[hPos] ← g3--; and
Line 35, "errBufc" should read --errBufC--.

COLUMN 16:

Line 6, "M. ¶ In" should read --M. In--; and
Line 30, "able" should read --table--.

COLUMN 19:

Line 33, "difference" should read --differences--.

COLUMN 20:

Line 39, "signal" should read --single--.

COLUMN 23:

Line 14, "values" should read --value--.

COLUMN 24:

Line 60, "sponding" should read --sponding to--.

UNITED STATES PATENT AND TRADEMARK OFFICE
CERTIFICATE OF CORRECTION

PATENT NO. : 7,342,684 B2
APPLICATION NO. : 10/664948
DATED : March 11, 2008
INVENTOR(S) : Kazuya Imafuku et al.

It is certified that error appears in the above-identified patent and that said Letters Patent is hereby corrected as shown below:

COLUMN 25:

Line 31, "manner. ¶ This" should read --manner. This--.

COLUMN 26:

Line 40, "(C threhold)" should read --(C threshold)--.

COLUMN 27:

Line 23, "(C threhold)" should read --(C threshold)--.

COLUMN 28:

Line 24, "an" should read --a--.

COLUMN 30:

Line 15, "in-jet" should read --ink-jet--;
Line 19, "hat" should read --heat--;
Line 28, "which being" should read --and be--; and
Line 42, "signal" should read --single--.

COLUMN 34:

Line 2, "pixel" should read --pixel,--.

Signed and Sealed this

Seventeenth Day of February, 2009

JOHN DOLL
*Acting Director of the United States Patent and Trademark Office*